United States Patent
Patrick et al.

(10) Patent No.: US 7,603,548 B2
(45) Date of Patent: Oct. 13, 2009

(54) SECURITY PROVIDER DEVELOPMENT MODEL

(75) Inventors: Paul Patrick, Manchester, NH (US); David Byrne, Woburn, MA (US); Kenneth D. Yagen, San Francisco, CA (US); Mingde Xu, San Jose, CA (US); Jason Howes, Cambridge, MA (US); Mark A. Falco, Lexington, MA (US); Richard J. Riendeau, Burlington, MA (US)

(73) Assignee: BEA Systems, Inc., Redwood Shores, CA (US)

( * ) Notice: Subject to any disclaimer, the term of this patent is extended or adjusted under 35 U.S.C. 154(b) by 600 days.

(21) Appl. No.: 10/961,675

(22) Filed: Oct. 8, 2004

(65) Prior Publication Data
US 2005/0097351 A1  May 5, 2005

Related U.S. Application Data

(60) Provisional application No. 60/508,427, filed on Oct. 10, 2003.

(51) Int. Cl.
*H04L 29/06* (2006.01)
*G06F 9/44* (2006.01)

(52) U.S. Cl. ............... 713/152; 713/150; 713/165; 717/172; 726/1

(58) Field of Classification Search .............. 726/1
See application file for complete search history.

(56) References Cited

U.S. PATENT DOCUMENTS

| | | | |
|---|---|---|---|
| 5,173,939 A | 12/1992 | Abadi et al. | 380/25 |
| 5,237,614 A | 8/1993 | Weiss | |
| 5,265,221 A | 11/1993 | Miller | |
| 5,335,345 A | 8/1994 | Frieder et al. | |
| 5,341,478 A | 8/1994 | Travis, Jr. et al. | 395/200 |
| 5,347,653 A | 9/1994 | Flynn et al. | |
| 5,355,474 A | 10/1994 | Thuraisngham et al. | |
| 5,369,702 A | 11/1994 | Shanton | 713/166 |
| 5,426,747 A | 6/1995 | Weinreb et al. | |
| 5,481,700 A | 1/1996 | Thuraisingham | 395/600 |

(Continued)

FOREIGN PATENT DOCUMENTS

EP  0 398 645  11/1990

(Continued)

OTHER PUBLICATIONS

Adomavicius, Gediminas, et al., "User Profiling in Personalization Applications Through Rule Discovery and Validation", KDD '99, San Diego, CA, © ACM 1999, pp. 377-381.
Cingil, Ibrahim, et al., "A Broader Approach to Personalization", Communications of the ACM, vol. 43, No. 6, Aug. 2000, pp. 136-141.

(Continued)

*Primary Examiner*—William R Korzuch
*Assistant Examiner*—Sarah Su
(74) *Attorney, Agent, or Firm*—Fliesler Meyer LLP

(57) ABSTRACT

A method for providing a security provider for a client comprises providing a service provider interface, that is compatible with a security framework layer, and one or more services. The one or more services include at least one of, authentication, authorization, auditing, role mapping and credential mapping. The one or more services can be exposed through the service provider interface and the framework layer can expose the one or more services to an application program interface.

23 Claims, 12 Drawing Sheets

U.S. PATENT DOCUMENTS

| | | | |
|---|---|---|---|
| 5,544,322 A | 8/1996 | Cheng et al. | |
| 5,557,747 A | 9/1996 | Rogers et al. | |
| 5,577,209 A | 11/1996 | Boyle et al. | |
| 5,619,710 A | 4/1997 | Travis, Jr. et al. | 395/800 |
| 5,627,886 A | 5/1997 | Bowman | 379/111 |
| 5,757,669 A | 5/1998 | Christie et al. | |
| 5,774,551 A | 6/1998 | Wu et al. | |
| 5,797,128 A | 8/1998 | Birnbaum | 707/5 |
| 5,809,230 A | 9/1998 | Pereira | |
| 5,825,883 A | 10/1998 | Archibald et al. | |
| 5,826,000 A | 10/1998 | Hamilton | |
| 5,826,268 A | 10/1998 | Schaefer et al. | 707/9 |
| 5,835,726 A | 11/1998 | Shwed et al. | |
| 5,841,869 A | 11/1998 | Merkling et al. | |
| 5,848,396 A | 12/1998 | Gerace | |
| 5,867,667 A | 2/1999 | Butman et al. | |
| 5,872,928 A | 2/1999 | Lewis | |
| 5,889,953 A | 3/1999 | Thebaut et al. | |
| 5,918,210 A | 6/1999 | Rosenthal et al. | |
| 5,925,126 A | 7/1999 | Hsieh | 713/200 |
| 5,941,947 A | 8/1999 | Brown et al. | |
| 5,950,195 A | 9/1999 | Stockwell et al. | |
| 5,954,798 A | 9/1999 | Shelton et al. | |
| 5,956,400 A | 9/1999 | Chaum et al. | |
| 5,966,707 A | 10/1999 | Van Huben et al. | |
| 5,968,176 A | 10/1999 | Nessett et al. | |
| 5,983,270 A | 11/1999 | Abraham et al. | |
| 5,983,350 A | 11/1999 | Minear et al. | |
| 5,987,469 A | 11/1999 | Lewis et al. | |
| 5,987,611 A | 11/1999 | Freund | |
| 5,991,877 A | 11/1999 | Luckenbaugh | 713/200 |
| 5,991,879 A | 11/1999 | Still | |
| 5,999,978 A | 12/1999 | Angal et al. | |
| 6,005,571 A | 12/1999 | Pachauri | 345/339 |
| 6,006,194 A | 12/1999 | Merel | |
| 6,009,507 A | 12/1999 | Brooks et al. | |
| 6,029,144 A | 2/2000 | Barrett et al. | |
| 6,029,182 A | 2/2000 | Nehab et al. | 715/523 |
| 6,029,196 A | 2/2000 | Lenz | |
| 6,029,246 A | 2/2000 | Bahr | |
| 6,035,399 A | 3/2000 | Klemba et al. | |
| 6,052,531 A | 4/2000 | Waldin et al. | |
| 6,054,910 A | 4/2000 | Tada et al. | |
| 6,055,515 A | 4/2000 | Consentino et al. | |
| 6,055,636 A | 4/2000 | Hillier et al. | |
| 6,055,637 A | 4/2000 | Hudson et al. | |
| 6,058,392 A | 5/2000 | Sampson et al. | 707/6 |
| 6,070,244 A | 5/2000 | Orchier et al. | |
| 6,073,242 A | 6/2000 | Hardy et al. | |
| 6,083,276 A | 7/2000 | Davidson et al. | 717/1 |
| 6,088,451 A | 7/2000 | He et al. | |
| 6,088,679 A | 7/2000 | Barkley | |
| 6,098,173 A | 8/2000 | Elgressy et al. | |
| 6,105,027 A | 8/2000 | Schneider et al. | |
| 6,108,687 A | 8/2000 | Craig | |
| 6,122,647 A | 9/2000 | Horowitz et al. | |
| 6,141,010 A | 10/2000 | Hoyle | 715/854 |
| 6,141,686 A | 10/2000 | Jackowski et al. | |
| 6,148,333 A | 11/2000 | Guedalia et al. | |
| 6,154,741 A | 11/2000 | Feldman | |
| 6,154,844 A | 11/2000 | Touboul et al. | |
| 6,157,924 A | 12/2000 | Austin | 707/10 |
| 6,158,010 A | 12/2000 | Moriconi et al. | 713/201 |
| 6,167,407 A | 12/2000 | Nachenberg et al. | |
| 6,167,445 A | 12/2000 | Gai et al. | |
| 6,170,009 B1 | 1/2001 | Mandal et al. | |
| 6,178,505 B1 | 1/2001 | Schneider et al. | |
| 6,182,226 B1 | 1/2001 | Reid et al. | 713/201 |
| 6,182,277 B1 | 1/2001 | DeGroot et al. | |
| 6,185,587 B1 | 2/2001 | Bernardo et al. | |
| 6,202,066 B1 | 3/2001 | Barkley et al. | |
| 6,202,157 B1 | 3/2001 | Brownlie et al. | |
| 6,202,207 B1 | 3/2001 | Donohue | |
| 6,209,101 B1 | 3/2001 | Mitchem et al. | |
| 6,216,231 B1 | 4/2001 | Stubblebine | |
| 6,226,745 B1 | 5/2001 | Wiederhold | 713/200 |
| 6,230,271 B1 | 5/2001 | Wadlow et al. | |
| 6,233,686 B1 | 5/2001 | Zenchelsky et al. | |
| 6,241,608 B1 | 6/2001 | Torango | 463/27 |
| 6,243,747 B1 | 6/2001 | Lewis et al. | |
| 6,253,321 B1 | 6/2001 | Nikander et al. | |
| 6,256,741 B1 | 7/2001 | Stubblebine | |
| 6,260,050 B1 | 7/2001 | Yost et al. | 715/501.1 |
| 6,269,393 B1 | 7/2001 | Yost et al. | 709/201 |
| 6,269,456 B1 | 7/2001 | Hodges et al. | |
| 6,275,941 B1 | 8/2001 | Saito et al. | |
| 6,285,366 B1 | 9/2001 | Ng et al. | |
| 6,285,985 B1 | 9/2001 | Horstmann | 705/14 |
| 6,292,900 B1 | 9/2001 | Ngo et al. | |
| 6,295,607 B1 | 9/2001 | Johnson | |
| 6,301,613 B1 | 10/2001 | Ahlstrom et al. | |
| 6,304,881 B1 | 10/2001 | Halim et al. | |
| 6,308,163 B1 | 10/2001 | Du et al. | 705/8 |
| 6,317,868 B1 | 11/2001 | Grimm et al. | |
| 6,321,336 B1 | 11/2001 | Applegate et al. | |
| 6,324,685 B1 | 11/2001 | Balassanian | |
| 6,327,594 B1 | 12/2001 | Van Huben et al. | |
| 6,327,618 B1 | 12/2001 | Ahlstrom et al. | |
| 6,335,972 B1 * | 1/2002 | Chandersekaran et al. | 380/286 |
| 6,339,423 B1 | 1/2002 | Sampson et al. | |
| 6,339,826 B2 | 1/2002 | Hayes et al. | |
| 6,341,352 B1 | 1/2002 | Child et al. | |
| 6,353,886 B1 | 3/2002 | Howard et al. | |
| 6,360,363 B1 | 3/2002 | Moser et al. | |
| 6,377,973 B2 | 4/2002 | Gideon | |
| 6,381,579 B1 | 4/2002 | Gervais et al. | |
| 6,385,627 B1 | 5/2002 | Cragun | |
| 6,393,474 B1 | 5/2002 | Eichert et al. | |
| 6,397,222 B1 | 5/2002 | Zellweger | |
| 6,397,231 B1 | 5/2002 | Salisbury et al. | |
| 6,408,336 B1 | 6/2002 | Schneider et al. | |
| 6,412,070 B1 | 6/2002 | Van Dyke et al. | |
| 6,412,077 B1 | 6/2002 | Roden et al. | |
| 6,418,448 B1 | 7/2002 | Sarkar | |
| 6,430,556 B1 | 8/2002 | Goldberg et al. | |
| 6,438,749 B1 | 8/2002 | Chamberlain | |
| 6,453,345 B2 | 9/2002 | Trcka et al. | |
| 6,453,353 B1 | 9/2002 | Win et al. | |
| 6,457,007 B1 | 9/2002 | Kikuchi et al. | |
| 6,460,141 B1 | 10/2002 | Olden | 713/201 |
| 6,463,470 B1 | 10/2002 | Mohaban et al. | |
| 6,466,239 B2 | 10/2002 | Ishikawa | |
| 6,466,932 B1 | 10/2002 | Dennis et al. | |
| 6,466,947 B2 | 10/2002 | Arnold et al. | |
| 6,473,791 B1 | 10/2002 | Al-Ghosein et al. | |
| 6,477,543 B1 | 11/2002 | Huang et al. | |
| 6,477,575 B1 | 11/2002 | Koeppel et al. | |
| 6,484,177 B1 | 11/2002 | Van Huben et al. | |
| 6,484,261 B1 | 11/2002 | Wiegel | |
| 6,487,594 B1 | 11/2002 | Bahlmann | |
| 6,510,513 B1 | 1/2003 | Danieli | |
| 6,519,647 B1 | 2/2003 | Howard et al. | |
| 6,530,024 B1 | 3/2003 | Proctor | |
| 6,539,375 B2 | 3/2003 | Kawasaki | 707/5 |
| 6,539,414 B1 | 3/2003 | Klein et al. | |
| 6,542,993 B1 | 4/2003 | Erfani | |
| 6,553,498 B1 | 4/2003 | Elgressy et al. | |
| 6,571,247 B1 | 5/2003 | Danno et al. | 707/100 |
| 6,581,071 B1 | 6/2003 | Gustman et al. | |
| 6,584,454 B1 | 6/2003 | Hummel et al. | |
| 6,587,849 B1 | 7/2003 | Mason et al. | |
| 6,587,876 B1 | 7/2003 | Mahon et al. | |
| 6,615,218 B2 | 9/2003 | Mandal et al. | |
| 6,618,806 B1 | 9/2003 | Brown et al. | |

| | | | | | | |
|---|---|---|---|---|---|---|
| 6,633,538 B1 | 10/2003 | Tanaka et al. | | 2001/0029517 A1 | 10/2001 | De Meno et al. |
| 6,651,249 B2 | 11/2003 | Waldin et al. | | 2001/0032128 A1 | 10/2001 | Kepecs |
| 6,654,747 B1 | 11/2003 | Van Huben et al. | | 2001/0034771 A1 | 10/2001 | Hutsch et al. |
| 6,665,677 B1 | 12/2003 | Wotring et al. | | 2002/0005867 A1 | 1/2002 | Gvily |
| 6,668,354 B1 | 12/2003 | Chen et al. ............... 715/517 | | 2002/0019827 A1 | 2/2002 | Shiman et al. |
| 6,678,827 B1 | 1/2004 | Rothermel et al. | | 2002/0029278 A1 | 3/2002 | Shiouchi et al. |
| 6,684,369 B1 | 1/2004 | Bernardo et al. | | 2002/0029296 A1 | 3/2002 | Anuff et al. |
| 6,697,805 B1 | 2/2004 | Choquier et al. | | 2002/0059394 A1 | 5/2002 | Sanders |
| 6,715,077 B1 * | 3/2004 | Vasudevan et al. ......... 713/191 | | 2002/0062451 A1 | 5/2002 | Scheidt et al. |
| 6,718,380 B1 | 4/2004 | Mohaban et al. | | 2002/0067370 A1 | 6/2002 | Forney et al. |
| 6,721,888 B1 | 4/2004 | Liu et al. | | 2002/0069261 A1 | 6/2002 | Bellare et al. |
| 6,732,144 B1 | 5/2004 | Kizu et al. | | 2002/0087571 A1 | 7/2002 | Stapel et al. |
| 6,735,586 B2 | 5/2004 | Timmons ...................... 707/3 | | 2002/0103818 A1 | 8/2002 | Amberden |
| 6,735,701 B1 | 5/2004 | Jacobson | | 2002/0104071 A1 | 8/2002 | Charisius et al. |
| 6,738,789 B2 | 5/2004 | Multer et al. | | 2002/0107913 A1 | 8/2002 | Rivera et al. ................ 709/203 |
| 6,751,659 B1 | 6/2004 | Fenger et al. | | 2002/0111998 A1 | 8/2002 | Kim |
| 6,754,672 B1 | 6/2004 | McLauchlin ............ 707/104.1 | | 2002/0112171 A1 | 8/2002 | Ginter et al. |
| 6,757,698 B2 | 6/2004 | McBride et al. | | 2002/0120685 A1 | 8/2002 | Srivastava et al. |
| 6,757,822 B1 * | 6/2004 | Feiertag et al. ............ 713/152 | | 2002/0124053 A1 | 9/2002 | Adames et al. |
| 6,769,095 B1 | 7/2004 | Brassard et al. | | 2002/0135617 A1 | 9/2002 | Samid |
| 6,769,118 B2 | 7/2004 | Garrison et al. | | 2002/0143819 A1 | 10/2002 | Han et al. |
| 6,772,332 B1 | 8/2004 | Boebert et al. | | 2002/0147645 A1 | 10/2002 | Alao et al. |
| 6,779,002 B1 | 8/2004 | Mwaura | | 2002/0152279 A1 | 10/2002 | Sollenberger et al. |
| 6,785,728 B1 | 8/2004 | Schneider et al. | | 2002/0161903 A1 | 10/2002 | Besaw |
| 6,789,202 B1 | 9/2004 | Ko et al. | | 2002/0169893 A1 | 11/2002 | Chen et al. |
| 6,792,537 B1 * | 9/2004 | Liu et al. .................... 713/182 | | 2002/0169954 A1 | 11/2002 | Bandini et al. |
| 6,807,636 B2 | 10/2004 | Hartman et al. | | 2002/0169975 A1 * | 11/2002 | Good ........................ 713/200 |
| 6,832,313 B1 | 12/2004 | Parker | | 2002/0173971 A1 | 11/2002 | Stirpe et al. ..................... 705/1 |
| 6,834,284 B2 | 12/2004 | Acker et al. | | 2002/0178119 A1 | 11/2002 | Griffin et al. |
| 6,854,035 B2 | 2/2005 | Dunham et al. | | 2002/0188869 A1 | 12/2002 | Patrick |
| 6,856,999 B2 | 2/2005 | Flanagin et al. | | 2002/0194267 A1 | 12/2002 | Flesner et al. |
| 6,857,012 B2 | 2/2005 | Sim et al. | | 2003/0014442 A1 | 1/2003 | Shiigi et al. |
| 6,865,549 B1 | 3/2005 | Connor | | 2003/0032409 A1 | 2/2003 | Hutcheson et al. |
| 6,873,988 B2 | 3/2005 | Herrmann et al. | | 2003/0065721 A1 | 4/2003 | Roskind |
| 6,880,005 B1 | 4/2005 | Bell et al. | | 2003/0078972 A1 | 4/2003 | Taipisser |
| 6,889,222 B1 | 5/2005 | Zhao | | 2003/0088617 A1 | 5/2003 | Clark et al. |
| 6,901,403 B1 | 5/2005 | Bata et al. | | 2003/0093615 A1 * | 5/2003 | Oliver et al. ................ 709/321 |
| 6,904,454 B2 | 6/2005 | Stickler | | 2003/0105974 A1 | 6/2003 | Griffin et al. |
| 6,920,457 B2 | 7/2005 | Pressmar | | 2003/0110172 A1 | 6/2003 | Selman et al. |
| 6,922,695 B2 | 7/2005 | Skufca et al. | | 2003/0110448 A1 | 6/2003 | Haut et al. |
| 6,931,549 B1 | 8/2005 | Ananda | | 2003/0115292 A1 | 6/2003 | Griffin et al. |
| 6,934,934 B1 | 8/2005 | Osborne et al. | | 2003/0115484 A1 | 6/2003 | Moriconi et al. |
| 6,941,471 B2 * | 9/2005 | Lin ................................ 726/1 | | 2003/0117437 A1 | 6/2003 | Cook et al. |
| 6,941,472 B2 | 9/2005 | Moriconi | | 2003/0120686 A1 | 6/2003 | Kim et al. |
| 6,957,261 B2 | 10/2005 | Lortz | | 2003/0126236 A1 | 7/2003 | Marl et al. |
| 6,961,897 B1 | 11/2005 | Peel et al. | | 2003/0126464 A1 | 7/2003 | McDaniel et al. |
| 6,965,999 B2 | 11/2005 | Fox et al. | | 2003/0126558 A1 | 7/2003 | Griffin |
| 6,970,445 B2 | 11/2005 | O'Neill et al. | | 2003/0131113 A1 | 7/2003 | Reeves et al. ................ 709/229 |
| 6,970,876 B2 | 11/2005 | Hotti et al. | | 2003/0131245 A1 | 7/2003 | Linderman |
| 6,978,379 B1 | 12/2005 | Goh et al. | | 2003/0140308 A1 | 7/2003 | Murthy et al. |
| 6,985,915 B2 | 1/2006 | Somalwar et al. | | 2003/0145275 A1 | 7/2003 | Qian et al. |
| 6,988,138 B1 | 1/2006 | Alcorn et al. | | 2003/0146937 A1 | 8/2003 | Lee |
| 7,003,578 B2 | 2/2006 | Kanada et al. | | 2003/0149722 A1 | 8/2003 | Jolley et al. |
| 7,035,879 B2 | 4/2006 | Shi et al. | | 2003/0154401 A1 * | 8/2003 | Hartman et al. ............. 713/201 |
| 7,035,944 B2 | 4/2006 | Fletcher et al. | | 2003/0167315 A1 | 9/2003 | Chowdhry et al. |
| 7,047,522 B1 | 5/2006 | Dixon et al. | | 2003/0167455 A1 | 9/2003 | Iborra et al. |
| 7,054,910 B1 | 5/2006 | Nordin et al. | | 2003/0182577 A1 * | 9/2003 | Mocek ....................... 713/201 |
| 7,062,490 B2 | 6/2006 | Adya et al. | | 2003/0187956 A1 | 10/2003 | Belt et al. |
| 7,062,511 B1 | 6/2006 | Poulsen | | 2003/0204481 A1 | 10/2003 | Lau |
| 7,080,000 B1 | 7/2006 | Cambridge | | 2003/0204719 A1 * | 10/2003 | Ben-Itzhak ................. 713/152 |
| 7,085,755 B2 | 8/2006 | Bluhm et al. | | 2003/0212673 A1 | 11/2003 | Kadayam et al. |
| 7,089,584 B1 | 8/2006 | Sharma | | 2003/0212766 A1 | 11/2003 | Giles et al. |
| 7,093,200 B2 | 8/2006 | Schreiber et al. | | 2003/0216938 A1 | 11/2003 | Shour |
| 7,143,151 B1 | 11/2006 | Kayashima et al. | | 2003/0220963 A1 | 11/2003 | Golovinsky et al. |
| 7,171,441 B2 | 1/2007 | Shiouchi et al. | | 2003/0229501 A1 | 12/2003 | Copeland et al. |
| 7,174,563 B1 | 2/2007 | Brownlie et al. | | 2003/0229623 A1 | 12/2003 | Chang et al. ..................... 707/3 |
| 7,185,332 B1 | 2/2007 | Waldin et al. | | 2003/0236977 A1 | 12/2003 | Levas et al. |
| 7,234,168 B2 | 6/2007 | Gupta et al. | | 2004/0003071 A1 | 1/2004 | Mathew et al. |
| 7,272,625 B1 | 9/2007 | Hannel et al. | | 2004/0010719 A1 * | 1/2004 | Daenen ....................... 713/201 |
| 7,293,080 B1 | 11/2007 | Clemm et al. | | 2004/0019650 A1 | 1/2004 | Auvenshine |
| 7,318,237 B2 | 1/2008 | Moriconi et al. | | 2004/0024812 A1 | 2/2004 | Park et al. |
| 7,350,226 B2 | 3/2008 | Moriconi et al. | | 2004/0030744 A1 | 2/2004 | Rubin et al. |
| 2001/0007133 A1 | 7/2001 | Moriconi et al. | | 2004/0030795 A1 | 2/2004 | Hesmer et al. |

| | | | |
|---|---|---|---|
| 2004/0034774 A1 | 2/2004 | Le Saint | |
| 2004/0078371 A1 | 4/2004 | Worrall et al. | |
| 2004/0098467 A1 | 5/2004 | Dewey et al. | |
| 2004/0098606 A1* | 5/2004 | Tan et al. | 713/200 |
| 2004/0107360 A1* | 6/2004 | Herrmann et al. | 713/201 |
| 2004/0153451 A1 | 8/2004 | Phillips et al. | |
| 2004/0162905 A1 | 8/2004 | Griffin et al. | |
| 2004/0162906 A1 | 8/2004 | Griffin et al. | |
| 2004/0167880 A1 | 8/2004 | Smith | |
| 2004/0167899 A1 | 8/2004 | Patadia et al. | |
| 2004/0205473 A1 | 10/2004 | Fisher et al. | |
| 2004/0205557 A1 | 10/2004 | Bahrs et al. | |
| 2004/0225893 A1 | 11/2004 | Ng | |
| 2004/0230546 A1 | 11/2004 | Rogers | |
| 2004/0236760 A1 | 11/2004 | Arkeketa et al. | |
| 2004/0243644 A1 | 12/2004 | Steere et al. | |
| 2004/0243824 A1 | 12/2004 | Jones | |
| 2004/0243835 A1 | 12/2004 | Terzis et al. | |
| 2004/0268148 A1* | 12/2004 | Karjala et al. | 713/201 |
| 2005/0021502 A1 | 1/2005 | Chen et al. | |
| 2005/0050184 A1 | 3/2005 | Boden et al. | |
| 2005/0060324 A1 | 3/2005 | Johnson et al. | |
| 2005/0097008 A1 | 5/2005 | Ehring et al. | |
| 2005/0182949 A1 | 8/2005 | Phillips et al. | |
| 2005/0198617 A1 | 9/2005 | Kim et al. | |
| 2005/0257267 A1 | 11/2005 | Williams et al. | |
| 2006/0059107 A1 | 3/2006 | Elmore et al. | |
| 2006/0085412 A1 | 4/2006 | Johnson et al. | |
| 2006/0122882 A1 | 6/2006 | Brown et al. | |
| 2006/0167858 A1 | 7/2006 | Dennis et al. | |
| 2006/0179296 A1* | 8/2006 | Bartlett et al. | 713/152 |
| 2007/0083484 A1 | 4/2007 | McVeigh et al. | |
| 2007/0245416 A1 | 10/2007 | Dickinson et al. | |

FOREIGN PATENT DOCUMENTS

| | | |
|---|---|---|
| EP | 1 256 889 A | 11/2002 |
| GB | 2360107 | 9/2001 |
| GB | 2385969 | 9/2003 |
| JP | 2002-528815 | 9/2002 |
| WO | WO 98/40987 | 9/1998 |
| WO | WO 98/40992 | 9/1998 |
| WO | WO 98/54644 | 12/1998 |
| WO | WO 99/57624 | 11/1999 |
| WO | WO 00/25214 | 5/2000 |
| WO | WO 00/38078 | 6/2000 |
| WO | WO0114962 A1 | 6/2000 |
| WO | WO0114962 A1 | 8/2000 |
| WO | WO 01/67285 A | 9/2001 |

OTHER PUBLICATIONS

Stephanidis, Constantine, et al., "Decision Making in Intelligent User Interfaces", IUI '97, Orlando, FL, © ACM 1997, pp. 195-202.

Stiemerling, Oliver, et al., "How to Make Software Softer—Designing Tailorable Applications", DIS '97, Amsterdam, The Netherlands, © ACM 1997, pp. 365-376.

Zhang, et al., "Designing a Robust Namespace for Distributed File Services", Reliable Distributed Systems, 2001, Proceedings 20th IEEE Symposium on Oct. 28-31, 2001, pp. 162-171.

Adya, et al., "FARSITE: Federated, Available and Reliable Storage for an Incompletely Trusted Environment", ACM SIGOPS Operating Systems Review, vol. 36, Issue SI (Winter 2002), OSD1 '02: Proceedings of the 5th Symposium on Operating Systems Design and Implementation, pp. 1-14.

Freudenthal, et al., "dRBAC: Distributed Role-Based Access Control for Dynamic Coalition Environments", Proceedings of the 22nd International Conference on Distributed Computing Systems (ICDCS '02), IEEE 2002, 10 pages.

C.W. Symborski, "Updating Software and Configuration Data in a Distributed Communications Network"; Computer Networking Symposium, 1988; pp. 331-338.

Kistler, et al., "WebL—a programming language for the web" Computer Networks and ISDN Systems, North Holland Publishing, Amsterdam, NL, vol. 30, No. 1-7, Apr. 1998, pp. 259-270.

Levy, "Web Programming in Guide", Software Practice & Experience, Wiley & Sons, Bognor Regis, GB, vol. 28, No. 15, Dec. 25, 1998 pp. 1581-1603.

Atkins, et al., "Mawl: A Domain-Specific Language for Form-Based Services" IEEE Transactions on Software Engineering, IEEE Service Center, Los Alamitos, CA, US, vol. 25, No. 3, May 1999. pp. 334-346.

Howes, "The String Representation of LDAP Search Filters", © The Internet Society, Dec. 1997 (RFC 2254) pp. 1-8.

Catley, et al., "Design of a Health Care Architecture for Medical Data Interoperability and Application Integration", Proceedings of the Second Joint EMBS/BMES Conference, Houston, TX, US, Oct. 23-26, 2002, IEEE, vol. 3, pp. 1952-1953.

Browne, et al., "Location-Independent Naming for Virtual Distributed Software Repositories", http://portal.acm.org/dl.cfm, ACM Symposium on Software Reusability, Seattle, WA, US, Aug. 1995, vol. 20, Issue SI, pp. 179-185.

European Search Report dated Dec. 19, 2006, Application No. EP 01975484.5, 3 pages.

Candan, et al., "Enabling Dynamic Content Caching for Database-Driven Web Sites", Proceedings of the 2001 ACM SIGMOD International Conference on Management of Data, Santa Barbara, CA, US, May 21-24, 2001, pp. 532-543.

Eiji Okamoto, "Proposal for Integrated Security Systems", Jun. 1992, IEEE Computer Society Press, p. 354-358.

http://java.sun.com/products/ejb/ (last visit: Dec. 7, 2004).

http://www.javaworld.com/jw-12-2002/jw-1207-yesnoejb_p.html (last visit: Dec. 7, 2004).

"USDataCenter Chooses Baltimore SelectAccess to Enable Next generation Security Solutions for eBusiness"; Business Wire, P2079, Apr. 4, 2001; Newswire; Trade; pp. 2.

Sundsted, Todd, "JNDI Overview, Part 1: An Introduction to Naming Services", JavaWorld, Jan. 2000. pp. 1-6, (downloaded from: www.javaworld.com/javaworld/jw-01-2000/jw-01-howto_p.html.).

Moore, Bill, et al., "Migrating Weblogic Applications to WebSphere Advanced Edition", IBM Redbooks, Jan. 2001, pp. 1, 3-4, 109-111 and 181-195.

Barrett, Alexandra, "Trying Out Transactions", SunExpert Magazine, Jan. 1999, pp. 57-59.

Ayers, Danny, et al., Professional Java Server Programming, Wrox Press, Ltd., Birmingham, UK, Dec. 1999, pp. 515-545.

Ford, Nigel, Web Developer.com Guide to Building Intelligent Web Sites with JavaScript, Wiley Computer Publishing, NY, NY © 1998, pp. 65-86, 96-98, 101-102, 245-250 and 324-327.

Microsoft Computer Dictionary, $4_{th}$ Edition, Microsoft Press, Redmond, WA, © 1999, p. 489.

Rossi, Gustavo, et al., "Designing Personalized Web Applications", WWW10, May 1-5, 2001, Hong Kong, ACM 1-58113-348-0/01/0005, pp. 275-284.

Tanyi, Emmanuel, Easy XML, Mar. 6, 2000, www.winsite.com, pp. 1-6.

IBM TDB, "Method and System for Visually Constructing Document Type Definitions and Related Artifacts Using a Reusable Object Model", IBM Technical Disclosure Bulletin, IP.com, Inc., May 23, 2001, 3 pages.

Parker, Elisabeth, "The Complete Idiot's Guide to Microsoft FrontPage 2000", 1999, QUE, pp. 7, 52, and 55.

Bertino et al., "TRBAC: A Temporal Role-Based Access Control Model," ACM Transactions on Information and System Security (TISSEC), vol. 4, Issue 3, Aug. 2001, pp. 191-223.

Covington et al., "Securing Context-Aware Applications Using Environment Roles," ACM Workshop on Role Based Access Control, Proceedings of the Sixth ACM Symposium on Access Control Methods and Technologies, 2001, pp. 10-20.

Georgiadis et al., "Flexible Team-Based Access Control Using Contexts," ACM Workshop on Role Based Access Control, Proceedings of the Sixth ACM Symposium on Access Control Methods and Technologies, 2001, pp. 21-27.

GOH et al., "Towards a More Complete Model of Role," Symposium on Access Control Model and Technologies, Proceedings of the Third ACM Workshop on Role-Based Access Control, 1998, pp. 56-61.

Hayton et al., "Access Control in an Open Distributed Environment," 1998, 12 pages.

Koved et al., "Security Challenges for Enterprise Java in an E-business Environment," IBM Systems Journal, vol. 40, No. 1, Jan. 2001, pp. 130-152.

Ryutov et al., "Dynamic Authorization and Intrusion Response in Distributed Systems," DARPA, vol. 1, Apr. 2003, pp. 50-61.

Sandhu et al., "Role-Based Access Control Models," IEEE Computer, vol. 29, No. 2, 1996, pp. 38-47.

Tzelepi et al., "A Flexible Content and Context-Based Access Control Model for Multimedia Medical Image Database Systems," International Multimedia Conference, Proceedings of the 2001 Workshop on Multimedia and Security, Oct. 5, 2001, pp. 52-55.

Yao et al., "A Model of OASIS Role-Based Access Control and its Support for Active Security," ACM Workshop on Role Based Access Control, Proceedings of the Sixth ACM Symposium on Access Control Methods and Technologies, 2001, pp. 171-181.

International Search Report and Written Opinion in connection with PCT/US06/01451 dated Oct. 19, 2007, 6 pages.

Microsoft Windows ("Windows Explorer") copyright 1981-2001, 3 pages.

Anderson, Paul, "Towards a High-Level Machine Configuration System," 1994 LISA, San Diego, CA, Sep. 19-23, 1994, pp. 19-26.

Casella, Karen A., "Security Administration in an Open Networking Environment," 1995 LISA IX, Monterey, CA, Sep. 17-22, 1995, pp. 67-74.

Harris et al., "The Design and Implementation of a Network Account Management System," 1996 LISA X, Chicago, IL, Sep. 29-Oct. 4, 1996, pp. 33-42.

Apostolopoulos et al., "Enforcing Security Policies in Large Scale Communication Networks," 1998, 5 pages.

Anand et al., "A Flexible Security Model for Using Internet Content," IEEE, 1997, pp. 89-96.

Lee, Amy, et al., "Keeping Virtual Information Resources Up and Running", IBM Centre for Advanced Studies Conference, Proceedings of the 1997 Conference of the Centre for Advanced Studies on Collaborative Research, IBM Canada, IBM Press, Nov. 1997, pp. 1-14.

Schwartau, Winn, "Securing the Enterprise," Network World, Jan. 27, 1997, vol. 14, Issue 4, ABI/INFORM Global, 4 pages.

Trostle et al., "A Flexible Distributed Authorization Protocol," IEEE, Proceedings of SNDSS 1996, pp. 43-52.

European Search Report dated Oct. 5, 2006, in connection with EP 02 77 3915, 3 pages.

European Search Report dated Jun. 7, 2006, in connection with EP 02 72 3874.

Hunter, J., "Java Servlet Programming," second edition, O'Reilly, Jan. 11, 2001.

Entitlenet, Inc., Website, 6 webpages, URL: www.entitlenet.com, Publication Date Unknown, Download Date: Nov. 17, 2000.

Field, John, "From Authorization to Transactional Entitlement," Transindigo, Inc. URL: www.transindigo.com, Published Sep. 2000.

Field, John, "Dynamic Enterprise Entitlement," Transindigo, Inc. URL: www.transindigo.com, Published Sep. 2000.

Field, John, "Using Elara (TM)," Transindigo, Inc. URL: www.transindigo.com, Published Sep. 2000.

"AppShield (TM) Version 3.0," Sanctum, Inc. URL: www.sanctuminc.com, Dec. 2000, 23 pages.

Bankers Trust, "Authorization Manager: User Guide," Bankers Trust, Feb. 1997, Print Date: Aug. 13, 1997.

Bankers Trust, "Security Instruction Services: User Guide," Bankers Trust, Feb. 1997, Print Date: Oct. 1, 1997.

Petrosky, Mary, "Directories in the Limelight," Network World, Mar. 16, 1998, vol. 15, Issue 11, ABI/INFORM Global, 4 pages.

Carter, Alan R., "Windows NT 4.0 MCSE Study Guide," 1997, ISBN: 0764530879.

Microsoft Press, Computer Dictionary, 3rd Edition, 1997, ISBN: 157231446XA.

International Search Report, in connection with Application No. PCT/US99/25455 dated Feb. 3, 2000.

International Search Report and Written Opinion, in connection with Application No. PCT/US04/04078 dated Nov. 15, 2005.

Foldoc, Dictionary definition: "API," dated Feb. 1995, retrieved from <http://foldoc.org/>.

Webopedia.com, Dictionary definition: "API," retrieved Oct. 2008, retrieved from ,http://webopedia.com/TERM/A/API.html>.

Issarny, et al., "Software architecture for mobile distributed computing," Software Architecture 2004, WICSA 2004, Proceedings of the Fourth Working IEEE/IFIP Conference, Jun. 12-15, 2004, pp. 201-210.

Huang, et al., "UML-based hardware/software co-design platform for dynamically partially reconfigurable network security systems," Computer Systems Architecture Conference 2008, ACSAC 2008, 13th Asia-Pacific, Aug. 4-6, 2008, pp. 1-8.

Liu, et al., "Active security support for active networks," Systems, Man and Cybernetics, Part C: Applications and Reviews, IEEE Transactions on vol. 33, Issue 4, Nov. 2003, pp. 432-445.

* cited by examiner

SECURITY PROVIDER DEVELOPMENT MODEL

CLAIM OF PRIORITY

This application claims priority from the following application, which is hereby incorporated by reference in its entirety:

U.S. Provisional Patent Application No. 60/508,427 entitled SYSTEMS AND METHODS FOR ENTERPRISE APPLICATION SECURITY, by Paul Patrick et al., filed Oct. 10, 2003.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS-REFERENCE TO RELATED APPLICATIONS

This application is related to the following co-pending applications which are each hereby incorporated by reference in their entirety:

U.S. patent application Ser. No. 10/961,595, entitled DISTRIBUTED ENTERPRISE SECURITY SYSTEM, by Paul Patrick et al., filed Oct. 8, 2004;

U.S. patent application Ser. No. 10/961,637, entitled DELEGATION IN A DISTRIBUTED SECURITY SYSTEM, by Paul Patrick et al., filed Oct. 8, 2004;

U.S. patent application Ser. No. 10/961,549, entitled DISTRIBUTED SECURITY SYSTEM WITH DYNAMIC ROLES, by Paul Patrick et al., filed Oct. 8, 2004;

U.S. patent application Ser. No. 10/961,351 entitled DISTRIBUTED SECURITY SYSTEM WITH SECURITY SERVICE PROVIDERS, by Paul Patrick et al., filed Oct. 8, 2004;

U.S. patent application Ser. No. 10/961,701 entitled EMBEDDABLE SECURITY SERVICE MODULE, by Paul Patrick et al., filed Oct. 8, 2004;

U.S. patent application Ser. No. 10/962,067 entitled CONFIGURATION OF A DISTRIBUTED SECURITY SYSTEM, by Paul Patrick et al., filed Oct. 8, 2004;

U.S. patent application Ser. No. 10/961,808 entitled POLICY ANALYSIS TOOL, by Paul Patrick et al., filed Oct. 8, 2004;

U.S. patent application Ser. No. 10/961,593 entitled DISTRIBUTED SECURITY SYSTEM POLICIES, by Paul Patrick et al., filed Oct. 8, 2004;

U.S. patent application Ser. No. 10/962,079 entitled POLICY INHERITENCE THROUGH NESTED GROUPS, by Paul Patrick et al., filed Oct. 8, 2004;

U.S. patent application Ser. No. 10/961,674, SECURITY CONTROL MODULE, by Paul Patrick et al., filed Oct. 8, 2004;

U.S. patent application Ser. No. 10/961,839 entitled DELEGATED ADMINISTRATION FOR A DISTRIBUTED SECURITY SYSTEM, by Paul Patrick et al., filed Oct. 8, 2004;

U.S. patent application Ser. No. 10/961,850 entitled DYNAMICALLY CONFIGURABLE DISTRIBUTED SECURITY SYSTEM, by Paul Patrick et al., filed Oct. 8, 2004;

U.S. patent application Ser. No. 10/961,544 entitled DYNAMICALLY CONFIGURABLE DISTRIBUTED SECURITY SYSTEM, by Paul Patrick et al., filed Oct. 8, 2004;

U.S. patent application Ser. No. 10/962,106 entitled DISTRIBUTED ENTERPRISE SECURITY SYSTEM, by Paul Patrick et al., filed Oct. 8, 2004; and U.S. patent application Ser. No. 10/961,677 entitled DISTRIBUTED ENTERPRISE SECURITY SYSTEM FOR A RESOURCE HIERARCHY, by Paul Patrick et al., filed Oct. 8, 2004.

INCORPORATION BY REFERENCE

The following U.S. Patent and U.S. Patent Publications are hereby incorporated by reference in their entirety:

U.S. Pat. No. 6,158,010 entitled SYSTEM AND METHOD FOR MAINTAINING SECURITY IN A DISTRIBUTED COMPUTER NETWORK, by Mark Moriconi et al,. issued Dec. 5, 2000.

U.S. patent application Ser. No. 09/878,536, entitled SYSTEM AND METHOD FOR SERVER SECURITY AND ENTITLEMENT PROCESSING, by Paul Patrick, filed Jun. 11, 2001, now U.S. Patent Publication No. US2002-0188869, published on Dec. 12, 2002;

FIELD OF THE DISCLOSURE

The present disclosure relates generally to systems and methods for a distributed security system that can be deployed to protect enterprise applications in a heterogeneous computing environment.

BACKGROUND

Companies are increasingly deploying network-based services (e.g., web services) to create enterprise-wide applications in heterogeneous computing environments. However, ensuring the security of such services is seen as a barrier to their wide-spread adoption.

Services are typically assembled from one or more software applications that may each implement their own proprietary security model and may each require their own form of administration. Thus, the security information and security procedures from one portion of an enterprise application may not be compatible with other portions. Furthermore, some security models may not take into account that users can have different policies depending on when and how they are interacting with a service. The result is a collection of services having incompatible silos of security.

Another reason why security remains a barrier to deploying web services is cost. Software developers can require extensive training before they are able to implement and deploy such systems. Developing a security system can also be seen as a distraction from a programmer's primary duty of developing application software. Even if this were not so, legacy applications not designed for dynamic changes in policy can require that security measures be intricately tied to the application itself. This leads to a security systems that are brittle and costly to maintain.

DETAILED DESCRIPTION

Figure 1:
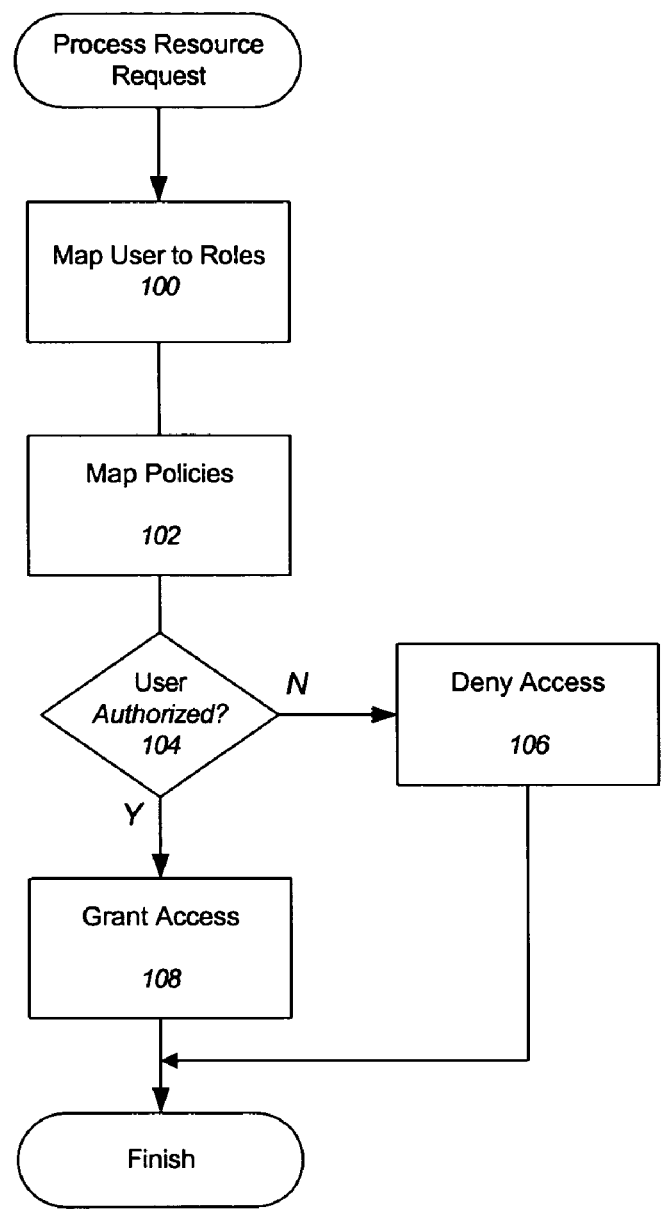
FIG. 1 is a flow diagram illustration of resource request processing in accordance to various embodiments of the invention.

The invention is illustrated by way of example and not by way of limitation in the figures of the accompanying drawings in which like references indicate similar elements. References to embodiments in this disclosure are not necessarily to the same embodiment, and such references mean at least one.

In the following description, numerous specific details are set forth to provide a thorough description of the invention. However, it will be apparent to one skilled in the art that the invention may be practiced without these specific details. In other instances, well-known features have not been described in detail so as not to obscure the invention.

In various embodiments, systems and methods disclosed herein provide an approach to security for enterprise-wide applications while allowing for simple integration with third party security products. Security can be administered and controlled through flexible policies. The system can perform fine-grained, business transaction-based authorization at each point of access of application and other resources. In various embodiments, a resource can represent a component of an application, information, a process, a service, a function, a device and/or any other suitable entity which can be interacted with programmatically. By way of illustration, resources can include (but are not limited to) the following:

Administrative resources such as an administration console and the application resources that represent enterprise applications. This can include individual Enterprise Application Archive (EAR) files and individual components, such as Enterprise Java® Bean (EJB) Java® Archive (JAR) files contained within an EAR file.

Component Object Model (COM) resources that are designed as program component objects.

Resources that are designed as connectors, which allow the integration of Java® applications with existing enterprise information systems.

Enterprise JavaBean (EJB) resources including EJB JAR files, individual EJBs within an EJB JAR, and individual methods on an EJB.

Java® DataBase Connectivity (JDBC) resources including groups of connection pools, individual connection pools, and multipools.

Java® Naming and Directory Interface (JNDI) resources.

Java® Messaging Service (JMS) resources.

Server resources related to servers. This type of resource includes operations that start, shut down, lock or unlock servers.

Uniform Resource Locator (URL) resources related to web applications. This type of resource can be a Web Application archive (WAR) file or individual components of a Web application (such as servlets and JSPs).

Web services resources related to services that can be shared by and used as components of distributed, Web-based applications. This type of resource can be an entire Web service or individual components of a Web service (such as a stateless session EJB, particular methods in that EJB, the Web application that contains the webservices.xml file, and so on).

Specific business transactions, such as a money transfer or security trade.

Application graphical user interface elements, such as web pages, windows, dialog boxes, buttons, text fields and menu selections.

Database, directory server or other information structures.

Products or services in a portal.

The present disclosure is not limited to or dependent on any type of resource. Accordingly, it will be apparent to those of skill in the art that any resource type presently known or yet to be developed is fully within the scope and spirit of the present disclosure.

Resources may contain attributes that provide additional information concerning the resource and how it may be accessed. For example, a filetype resource attribute could indicate whether a resource has a corresponding HTML, image, JSP or PDF representation. By way of illustration, permission to view a resource could be granted if the resource has a filetype equal to PDF. Such permissions are termed policies. Policies embody the security needs and reflect the business processes of an organization. Policies can be analogized to declarative rules, such as:

Only employees in the sales team may view sales documents

Or

Only employees in the sales team who are regional managers can alter discounts.

Policies dynamically identify resources that need to be protected, privileges or roles allowed each resource, and constraints that apply to each user or group of users that attempt to access the resource. In various embodiments, roles can be defined to dynamically associate users and/or groups of users based on some criteria. For example, a system administrator role might include all users having a certain skill level and only during certain times of day (e.g., after 5:00 pm). In various embodiments, the granting of roles can be expressed as policies (i.e., role policies). An authorization policy can be based on role(s) such that it determines which role(s) are permitted to access a resource under certain conditions.

In various embodiments, the system can use several categories of policies:

Authentication Policy—controls whether authentication is required and the constraints and/or rules under which it is allowed;

Role Policy—determines which users and/or groups of users are in a role based on rules and/or constraints;

Authorization Policy—dynamically determines whether a role, user or group of users are permitted to perform an action or access a resource based on rules and/or constraints; and Auditing Policy—defines auditing information to be captured and stored in a designated place.

Once policies are deployed, security provider modules (see below) can apply them to the resources that they are managing.

In various embodiments, each component of the system may have a unique or shared configuration. In aspects of these embodiments, configuration can be managed through an administration console. Configuration also can be used to configure security provider modules (see below) for supported service types (e.g., Authentication, Authorization, Auditing, Role Mapping and Credential Mapping). For example, a security provider module installed on an intermediate network between an untrusted external network and a trusted internal network might be used to authenticate incoming user requests against a customer database, control which parts of the application user interface the user can access based on their role in the organization, and pass their identity to an application behind the firewall. An authentication security provider could be configured to provide this service. An audit security provider could also be configured so that all transactions are audited.

In various embodiments, authentication policy is used to determine the constraints under which a user, known to trusted authentication services and can prove who they claim to be, is permitted to be authenticated. These services may be embodied in an operating system, a Lightweight Directory Access Protocol (LDAP) directory, or a legacy application, for example. By way of illustration, the method of authentication can depend on the type of user directory and authentication method desired, or on the form of identity accepted from a trusted external source (e.g., a web application might require a simple username and password, whereas a financial application might require more stringent authentication). In username and password authentication, a user provides an identification and a matching password, which a configured provider (e.g., LDAP, Windows NT, or database) can then check against the configured directory to validate the user's identity.

By way of illustration, two other types of authentication are certificate-based And single sign-on. Certificate-based authentication is typically used when a TLS/SSL or HTTPS client requests access and presents its digital certificate to the server. The server passes a certificate to an X.509 Identity Asserter provider, which verifies the digital certificate and creates a local identity. The digital certificate is issued by a trusted certificate authority and is accepted as a form of user authentication. A Single Sign-On form of authentication is typical in a setting where the users are using multiple applications, each of which maintains its own security and requires user identity to control access. These may be within an organization, through an employee portal or externally on a completely different domain. For example, if the user requires access to separate applications, one in New York with a local LDAP and the other in London that uses a proprietary user database, a SAML identity assertion credential may be passed between these environments and either consumed by the remote security system directly or converted to a local identity through credential mapping.

In various embodiments, authorization policy can be based on the roles a user or group of users may hold at the time a resource access request is made. Unlike groups, which are relatively static and can persist for a session, roles are dynamic and are assigned to users or groups of users by evaluating role policies. For example, a group of bank tellers might have access to the same set of applications to perform specific banking tasks. Thus, there might be a role called Teller that encompasses the bank tellers. Authorization and other policies could then be enacted to restrict access to the applications only to users in the role of Teller. Role policies can significantly reduce the overall number of policies required and makes features like delegation easier to manage. Role policies can be combined with authorization requests or may be directly evaluated to support uses like application or portal personalization.

In various embodiments, authorization policies are associated with a resource. In aspects of these embodiments, resources can be organized in a hierarchy. The hierarchical children of a given resource in the hierarchy inherit the authorization policies associated with their parent resource(s). In aspects of these embodiments, authorization policies assigned to individual resources take precedence or override inherited authorization policies. By way of illustration, assume resource C is a child of resource B, and resource B is a child of resource A. If policy P1 is associated with A, B and C will inherit P1. If policy P2 is associated with B (which is for the same control of access as P1), B and C will not inherit P1, but C will inherit P2. Finally, if C is associated with a policy P3 (which is for the same control of access as P2), then C will not inherit P2. If P1, P2 and P3 were all for different rules for controlling access, then B would inherit P1 and C would inherit P1 and P2.

Generally speaking, an authorization policy can be specified as follows (wherein items in square brackets indicate alternatives; italic font indicates optional items):

[GRANT, DENY, DELEGATE] [action, role], resource, subject, delegator)

IF (constraint condition)$_1$ ... IF (constraint condition)$_N$;

Where:

GRANT permits a specified action. DENY revokes it. DELEGATE assigns an action from one subject to another;

Action is the name of a resource or resource attribute to grant, deny or delegate. Role is the name of a role to grant, deny or delegate;

Resource is the fully qualified or short-hand name of the resource that this policy will be associated with;

Subject is the fully qualified name of one or more users, groups and/or roles that are granted/denied/delegated the authorization policy or the role. A special subject called any denotes that any user, group and role is potentially a subject;

Delegator is optionally specified for delegation and is the subject delegating the role or action to the subject; and IF (constraint condition) is one or more optional conditions placed on the action. Conditions can include one or more arithmetic and logical functions and expressions involving attributes of resources or other entities in the system, such as user attributes, group membership, dynamic attributes (e.g., time, date, location), delegation attributes and other suitable information.

In various embodiments, and by way of illustration, user and user group information can be stored and managed in external directories and databases and can be gathered and/or calculated at authentication time. For example, the source of user information might be an employee database, which would include the fact that the user is in the Sales department group, in the London office group, and in the star-salesmen group. Typically, it is desirable to establish a policy that applies to a large community of people, as establishing policies for each and every user can be time consuming, tedious, and hard to manage. Organizational structure, in the form of groups, maps well to typical business policies and is very useful for determining authorization and role policy. Thus, it is desirable to create groups of users (or groups of groups) whose tasks are related. For example, the following policy grants the ability to open accounts via the resource TellerApp to all users and groups belonging to the Tellers group from 9:00 AM to 5:00 PM, Monday through Friday:

GRANT (OpenAccount, //app/policy/TellerApp, //sgrp/Tellers) if time24 in [900 . . . 1700] AND if dayofweek in [Monday . . . Friday];

An alternative to defining a group of users is to specify a role which defines the conditions under which a user or group of users is provided a capability. Roles are desirable when group membership tends not to be static (e.g., based on prevailing conditions). Roles are used to abstract the capabilities mechanism and represent a business task that a user or group of users are entitled to perform. In the above example, if instead a role called Tellers was used, the policies could be specified as follows:

GRANT (//role/Tellers, //app/policy/TellerApp, any) if (is_employee=TRUE AND (employee.position=Teller OR employee.position=manager));

GRANT (OpenAccount, //app/policy/TellerApp, //role /Tellers) if (time24 in [900 . . . 1700] AND if dayofweek in [Monday . . . Friday]);

The first policy defines a role named Tellers which includes anybody that is an employee and who happens to have a position of teller or manager. The second policy permits the OpenAccount action to be performed by a user that holds the Tellers role, subject to the constraints of time and day. By defining Tellers as a role, its definition can change dynamically as employee accounts are created and modified whereas a group definition would have to be changed along with employee accounts to remain current.

In various embodiments, role and authorization policies can also be based on contextual data available at run-time (e.g., a transaction amount passed in as a parameter). In some cases, a policy constraint can utilize information that is not locally available and which could require the security provider module (see below) to retrieve it from another source or compute it from another piece of data. For example, assume that an account balance is an attribute of a customer. To allow customers with an account balance over $100,000 access to the premier banking features of an application, the following policy could be defined:

GRANT (//role/premierbanking, //app/policy/bankapp, //sgrp/bankusers/customers/) if (accountbalance>100000);

In various embodiments, delegation is the transfer of capabilities from one user or group to another, and optionally under certain conditions. For example, a manager may delegate the ability to approve expense reports to his secretary. Delegation is often used by administrative users to control policy for other administrative users or for application users to allow someone else to perform an action for them or in their absence. In various embodiments, there can be restrictions on what rights can be further delegated by the delegate.

A policy can be used to delegate a role or privilege from one subject (i.e., the delegator) to another (i.e., the delegate). By way of illustration, delegation policies can be described with the following syntax:

DELEGATE ([action, role], resource, delegate, delegator) IF (constraint condition)$_1$ . . . IF (constraint condition)$_N$;

In various embodiments, the delegate gets the ability to perform an action if the constraints evaluate to true and if the delegator would also get the ability to perform an action under the same conditions. If the delegator later loses the rights he has delegated, the delegate also loses them. In aspects of these embodiments, a delegator's identity information can be retrieved dynamically in order to determine if, at time of evaluation, the delegator has the capabilities (role) being delegated. By way of illustration, a delegator can put additional constraints on what is being shared. Constraints can include support for time-based restrictions such as (but not limited to) the following:

Range of time (e.g., 6/5/2003-6/10/2003);

After specific start time (e.g., after 1/1/2004 17:00:00);

Until expiration time (e.g., until 7/1/2003 09:00:00);

On a repeating time (e.g., Fridays, Weekends, 7:00:00-9:00:00 every day);

Related to action being delegated (e.g., Joe can approve my trades for me if they are less than $5,000); and Based on an attribute of the delegate (e.g., Joe can approve my trades for me if they are less than his trading limit.).

In various embodiments, a delegate can re-delegate capabilities/rights to another subject. The ability to re-delegate can be protected such that re-delegation could be prevented when the original delegation is made. In various embodiments, a delegator can indicate if the delegate can re-delegate the rights they are delegated.

By way of illustration, suppose George delegates the ability to author a product requirements document (PRD) to Andy, and also gives Andy the permission to delegate this ability further (not shown). Assuming the following delegated roles:

DELEGATE (//role/author, //app/PRD, Andy, George)

DELEGATE (//role/editor, //app/PRD, //group/Managers, George);

DELEGATE (//role/reader, //app/PRD, //group/Engineers, George);

GRANT (//priv/write, //app/PRD, //role/author);

The author role is delegated to Andy from George. Thus, Andy can be in the author role whenever George could be. George also delegates the roles of editor and reader to the groups Managers and Engineers, respectively. As with the author role, Managers can be in the editor role and Engineers can be in the reader role whenever George can be in those roles.

By way of further illustration, Andy then decides to make Ken an author on an "authorization" section of the PRD. This is possible because George did not restrict Andy from re-delegating this role:

DELEGATE (//role/author, //app/PRD, Ken, Andy) if (section="authorization")

Assuming that Ken is a Manager and an Engineer he can get the editor and reader roles on the PRD. Accordingly, Ken can act as an author if he's working on the "authorization" section and if Andy (the delegator) can act as an author on the PRD when the section is "authorization." The first policy says that Andy is always an author on the PRD so Andy's policy gets a grant, which makes the delegation policy return true and Ken picks up the "author" role assuming the given section is the "authorization" section. If Ken were trying to "write" in the PRD, he would only be able to if he had picked up the "author" role.

In various embodiments, delegation policies can be used to create administrative policy. In aspects of these embodiments, the rights of an administrator can be delegated by an administrator with greater rights than their own. Default administrative policies can be provided in this regard.

In various embodiments, auditing of administrative policy actions can be performed. This can include recording whether permission to perform an action was granted and whether the action was actually performed.

In various embodiments, delegation rules can be evaluated for authorization of a resource request only if a decision has not been reached with authorization policy rules. Such an algorithm can be used to require delegation evaluation in all cases.

FIG. 1 is a flow diagram illustration of resource request processing in accordance to various embodiments of the invention. Although this figure depicts functional steps in a particular order for purposes of illustration, the process is not necessarily limited to any particular order or arrangement of steps. One skilled in the art will appreciate that the various steps portrayed in this figure can be omitted, rearranged, performed in parallel, combined and/or adapted in various ways.

In various embodiments, a client request to perform an operation on a resource can be intercepted and provided to a security service module (SSM). In various embodiments, an SSM can be integrated with a server, application server, web server, a process or any suitable device such as network firewalls, routers, relays, appliances, etc. In aspects of these embodiments, a container (e.g., an EJB or servlet container) can intercept the request and present it to a SSM. By way of illustration, the SSM can be provided with a subject that holds an authenticated identity (e.g., an authenticated user), a resource identifier, user group information, and/or a context handler object through which the SSM can obtain additional information about the context of the request.

Referring to FIG. 1, a process for handling intercepted resource requests is illustrated. In step 100, a role mapping process maps the user that initiated the request to role(s) based on evaluation of one or more role policies. In various embodiments, role mapping can occur just prior to when an access decision is rendered for a protected resource. In step 102, zero or more applicable authorization policies are determined based on the subject, mapped roles and the resource (which is the target) of the request and requested action. Based on an evaluation of the authorization policies (if any) in step 104, permission to access the resource is either granted in step 108 or denied in step 106.

Figure 2:
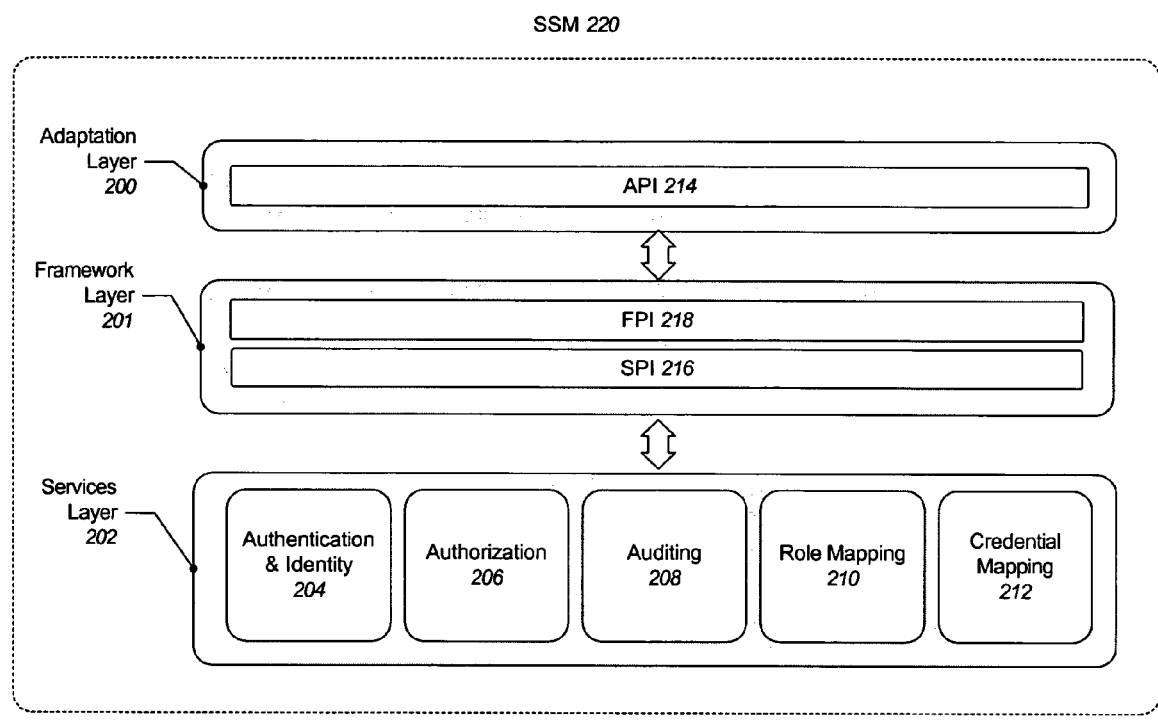
FIG. 2 is an illustration of an exemplary security service module in accordance to various embodiments of the invention.

In various embodiments, resource request processing is performed by an SSM. FIG. 2 is an illustration of an exemplary SSM in accordance to various embodiments of the invention. Although this diagram depicts components as logically separate, such depiction is merely for illustrative purposes. It will be apparent to those skilled in the art that the components portrayed in this figure can be combined or divided into separate software, firmware and/or hardware components. Furthermore, it will also be apparent to those skilled in the art that such components, regardless of how they are combined or divided, can execute on the same computing device or can be distributed among different computing devices connected by one or more networks or other suitable communication means.

In aspects of these embodiments, the SSM 220 includes several functional layers that can reside in one or more processes. An adaptation layer 200 ties a framework layer 201 and a services layer 202 to a run-time environment. By way of example, a runtime environment can include an application/web server, an application program, a network firewall, and other suitable environments that require enterprise security. The adaptation layer includes an Application Program Interface (API) 214 to allow exploitation of the framework layer in the run-time environment. In aspects of these embodiments, an API can comprise a programmatic interface (e.g., class, method and/or function definitions), a communication interface such as a web service or other suitable mechanism for exchanging messages, and/or any other suitable protocol for invoking functionality and exchanging information. The present disclosure is not limited to or dependent on any API implementation presently known or yet to be developed, as will be appreciated by those of skill in the art.

The adaptation layer can invoke services of the framework layer via a framework programming interface (FPI) 218. Likewise, the framework layer can invoke services of the services layer via a service provider interface (SPI) 216. As with the adaptation layer API, the FPI and SPI can comprise a programmatic interface (e.g., class, method and/or function definitions), a communication interface such as a web service or other suitable mechanism for exchanging messages, and/or any other suitable protocol for invoking functionality and exchanging information. The present disclosure is not limited to or dependent on any FPI/SPI implementation presently known or yet to be developed, as will be appreciated by those of skill in the art.

In aspects of these embodiments, the FPI can translate API invocations into one or more SPI invocations. The FPI also hides the SPI from the adaptation layer, thus preventing any dependency on the SPI from forming. The SPI provides the FPI access to a set of dynamically configurable security services represented as "plug in" security provider modules ("providers"). In various embodiments, each module is compatible with the SPI. The services layer can be provided with a default set of providers. In another embodiment, the adaptation layer can communicate directly with the services layer, without an intervening framework layer (e.g., the API could invoke the SPI directly).

By way of illustration, authentication provider(s) 204 can authenticate, verify, and map security tokens to an internal format and support, for example, a single sign-on capability. Authorization provider(s) 206 can enforce authorization policies for resources that take authorization policy into consideration. Audit provider(s) 208 can audit some or all security actions taken by the framework layer. Role mapping provider(s) 210 can map roles to users/groups based on role definitions. Finally, credential mapping provider(s) 212 can map authentication credentials for a user to legacy application for single sign-on. The services layer can accommodate more than one provider of the same type.

Figure 3:
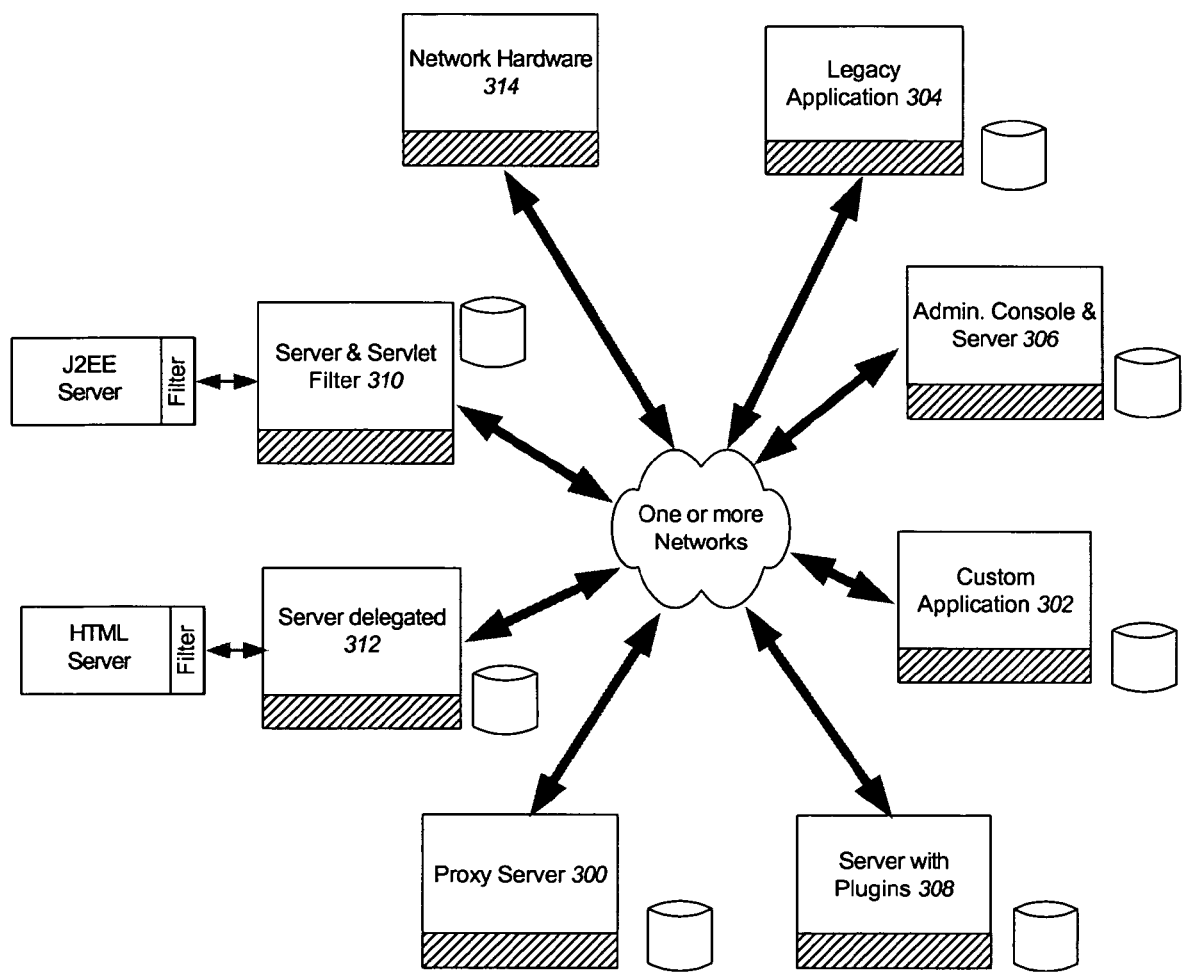
FIG. 3 is an illustration of an exemplary security service module deployments in accordance to various embodiments of the invention.

FIG. 3 illustrates exemplary SSM deployments in accordance to various embodiments of the invention. Although this diagram depicts components as logically separate, such depiction is merely for illustrative purposes. It will be apparent to those skilled in the art that the components portrayed in this figure can be combined or divided into separate software, firmware and/or hardware components. Furthermore, it will also be apparent to those skilled in the art that such components, regardless of how they are combined or divided, can execute on the same computing device or can be distributed among different computing devices connected by one or more networks or other suitable communication means.

In various embodiments and by way of illustration, SSMs can be deployed in applications, network hardware components, application servers, web servers, proxy servers, and any other suitable systems requiring security. For example, a legacy 304 or custom application program 302 can be modified to utilize the SSM through an API or other suitable means. An application/web server can also be configured to use the SSM via a J2EE servlet filter 310, security plugin provider 308, or delegated 312, as are commonly known in the art. The SSM can also be deployed in a proxy server 300. Finally, the SSM can be utilized in networking hardware 314 such as (but not limited to), a switch, router, relay, bridge, repeater or a hub.

In various embodiments, an administration console and server 306 allows an administrator or other user to create, modify and delete user, group and policy definitions. In addition, the administrator has the capability to delegate administrative privileges to other users. In various embodiments, the administration console allows a user to pose "what if" policy questions to determine what users/groups have access to a resource under a given set of conditions. The administration console can communicate with an administrative server which can dispense provisioning information (e.g., policy and/or configuration information) itself, or can utilize a distribution point process. Provisioning information can be dispensed to SSMs directly, or via one or more intermediate processes (e.g., SCMs).

Figure 4:
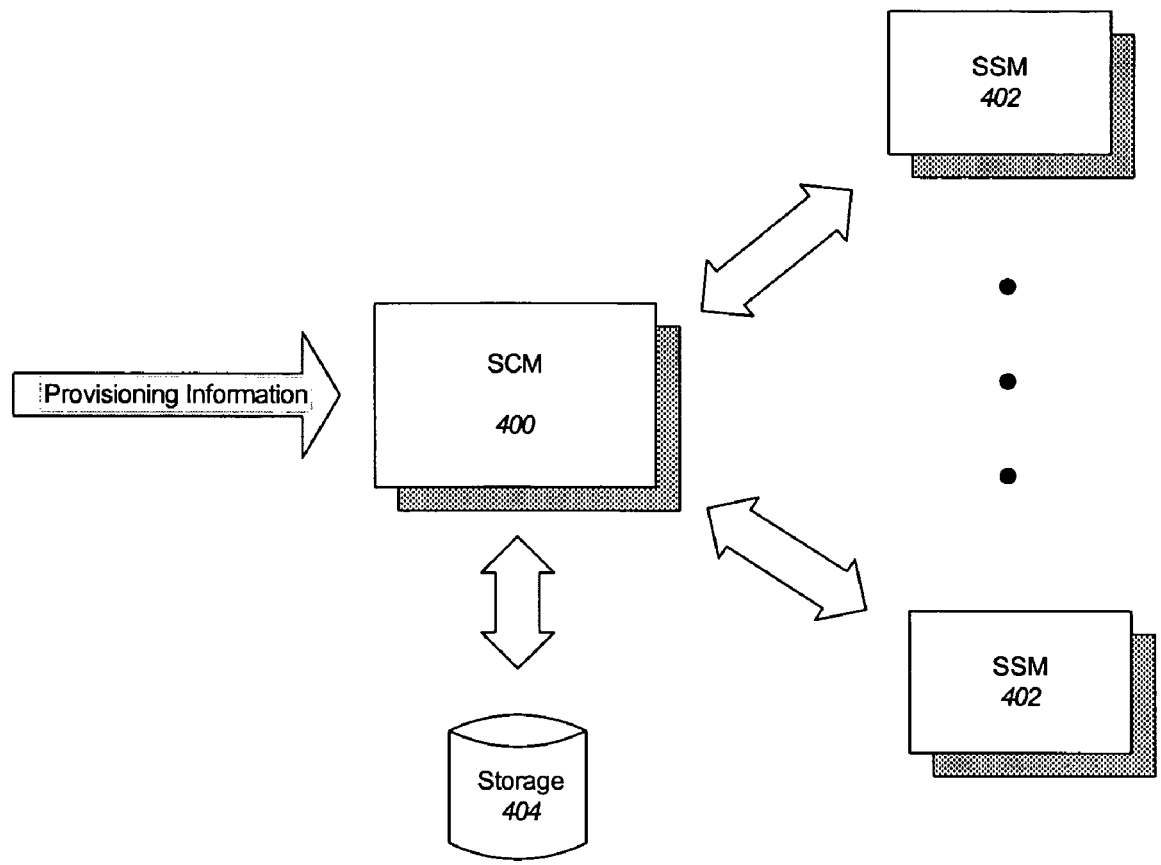
FIG. 4 is an illustration of information provisioning in accordance to various embodiments of the invention.

FIG. 4 is an exemplary illustration of information provisioning in accordance to various embodiments of the invention. Although this diagram depicts objects/processes as logically separate, such depiction is merely for illustrative purposes. It will be apparent to those skilled in the art that the objects/processes portrayed in this figure can be combined or divided into separate software and firmware components. Furthermore, it will also be apparent to those skilled in the art that such objects/processes, regardless of how they are combined or divided, can execute on the same computing device or can be distributed among different computing devices connected by one or more networks or other suitable communication means.

In various embodiments, policy and configuration information is distributed to SSMs 402 via Security Control Mangers (SCMs) 400. This is referred to as "provisioning". SCMs can reside anywhere on a computer network. In one embodiment, an SCM resides locally on systems that have one or more SSMs 402. An administration server can provision the policy and configuration information to an SCM as a provisioning request. In one embodiment, the information provisioned to an SCM is only relevant to SSMs deployed on the same system as the SCM. In aspects of these embodiments, only changes ("deltas") to this information are propagated to SCMs. This is desirable since it can reduce the amount of information that needs to be transmitted between the administration server and the SCMs. By way of illustration, this can be accomplished by associating a version number with provisioning information or subsets thereof.

SCMs can cache provisioned information in a local store 404 and further provision it to one or more SSMs. In one embodiment, an SCM provisions information to SSMs that reside on the same system as the SCM. In various embodiments, provisioned configuration information can specify security providers, locations of directory servers, databases, and other suitable information. By way of illustration, an SSM can dynamically load security providers based on configuration information supplied to it by an SCM.

The SCM has many architectural benefits for the system. Firstly, the SCM can serve as the sole external management interface for all SSM components. This can eliminate redundant management infrastructure in system components, thus allowing all system components to take advantage of improvements in future versions of the SCM management interface. Secondly, having a single management interface per computing device has security benefits. An SCM-enabled host can expose a single management communication channel rather than one per SSM. This eliminates the need for a listen port in each SSM process, drastically reducing the number of open ports that are required to be secured and monitored. Finally, the use of the SCM can greatly simplify SSM configuration. Rather than relying on instance specific configuration files, an SSM can retrieve its entire configuration from the SCM via a well-known communication port.

A typical deployment of the system can consist of one or more SSMs distributed throughout an enterprise—embedded in applications, application servers, appliances, routers, web servers and other suitable systems. Configuring a potentially large number of distributed SSMs is a non-trivial task. Traditional configuration mechanisms, such as the use of local property files, break down as the number of configured entities increases. Rather than forcing customers to edit and maintain a property file for each SSM instance, the system includes a provisioning infrastructure that allows customers to manage the configuration of all SSMs through an administration console.

An SCM can supply provisioned information to SSMs as needed (e.g., In response to requests by SSMs). An SCM can also convey the information automatically without being requested to do so. In various embodiments, an SCM only provides provisioning information to an SSM that is relevant to that SSM. In aspects of these embodiments, the SCM provides only deltas to SSMs. In various embodiments, communication between system components can be accomplished with secure protocols. By way of illustration, mutually authenticated Transport Layer Security (TSL) connections can be utilized between components. In addition, the SCM and SSM can exchange Public-Key Infrastructure (X.509) certificates to establish identity and trust.

In various embodiments, support for Security Assertion Markup Language (SAML) is provided. SAML is a protocol for propagating identity that can be used from one security domain to the next and between components in the system. By way of example, a dynamic webpage can accept a user name and a password. These can be provided to a SAML authentication security provider via the SSM API. The authentication provider can perform authentication and return an artifact which can be passed back to the webpage and/or exchanged with other applications that require SAML assertions. Likewise, the SAML authentication provider can accept an artifact and return an indication of whether it is valid or not.

With reference to FIGS. 1-2, role policies can be evaluated as part of role mapping. In various embodiments and before a decision as to whether to allow access to a resource is rendered, role mapping can be performed to determine whether a user can be dynamically granted a role. The computed role can access information in the context of the resource request, including the identity of the target resource (if available), desired action to be performed and the parameter values (if any) of the request. The context information can be used as parameters in an expression that is evaluated by the SSM.

With reference to FIG. 2, a security provider module exposes a programmatic interface(s) for integrating itself into the SSM and for retrieving management and configuration information. In various embodiments, a provider does not need to support management operations, just configuration. If management operations are supported, they can be exposed in the administration console or other system/application. In various embodiments, a security provider can make available a configuration schema. By way of illustration, this feature is useful if the administration console is to display information about the configuration properties for a provider. An interface can be included in the SPI for retrieving (and setting) this information. In various embodiments, the SSM can use configuration information to enumerate and create provider instances for a particular SSM instance and can pass configuration information to each newly instantiated security provider during its initialization. By way of illustration, configuration schemas can be declared as Extensible Markup Language (XML) documents that conform to a security provider configuration XML schema. The XML schema can define how configuration parameters are expressed, and the definition can include parameter name, type, and value constraints.

Figure 5:
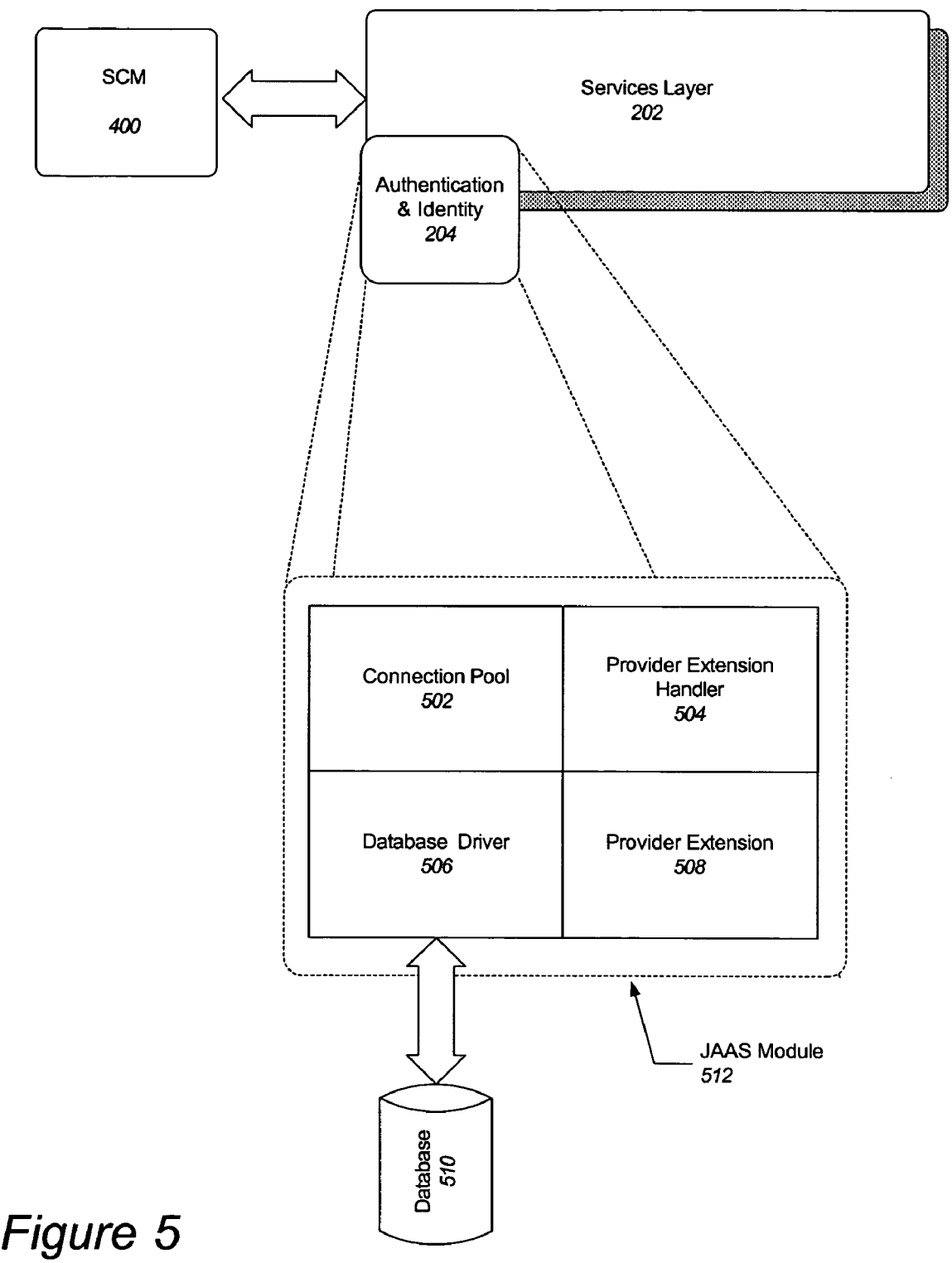
FIG. 5 is an illustration of an exemplary authentication provider in accordance to various embodiments of the invention.

FIG. 5 is an exemplary illustration of an authentication provider in accordance with various embodiments of the invention. Although this diagram depicts components as logically separate, such depiction is merely for illustrative purposes. It will be apparent to those skilled in the art that the components portrayed in this figure can be combined or divided into separate software, firmware and/or hardware components. Furthermore, it will also be apparent to those skilled in the art that such components, regardless of how they are combined or divided, can execute on the same computing device or can be distributed among different computing devices connected by one or more networks or other suitable communication means.

A Java® Authentication and Authorization Service (JAAS) authentication provider 512 as part of an SSM services layer 202 can authenticate user credentials against various sources of data. The JAAS can include a Database Driver 506. The provider implements an SPI for authentication providers in order to integrate itself into the services layer. In one embodiment, configuration information can be provided to the authentication provider as an Authenticator MBean. An MBean is a Java® object that implements the Java® Management Extensions (JMX) specification.

By way of illustration, the provider can utilize databases 510 such as relational databases (RDBMs), Java® Database Connectivity (JDBC) data sources, and other sources of credential information. To maximize performance database connection pooling 502 can be implemented in the provider.) A given user name can be used to lookup a user's record in a database. If the lookup locates a record in the database for the user, the password supplied can be compared against the password in the database for the user. If required, the record can also be checked to determine if it is disabled/locked out. Through configuration, the provider can be equipped with sufficient information to query a database source through JDBC and query or retrieve the necessary information. It can verify that the user exists in a store, validate a user password algorithm and retrieve user group and attribute information.

In various embodiments, providers can obtain user attribute information in at least three ways: 1) information passed to the provider as part of an authorization request; 2) information obtained from another service as needed; and 3) information obtained by evaluating policies. In various embodiments, user attributes, group membership, security credentials and other suitable information can be queried from repositories and made accessible to authentication and authorization providers within the SSM. In addition, such information can be cached to improve performance. By way of illustration, a Lightweight Directory Access Protocol (LDAP) interface for authorization and role mapping providers to a separate attribute service can be provided to obtain user-related information. Alternatively, a Simple Object Access Protocol (SOAP) interface to the attribute service can be provided. In yet another illustration, a database interface to a user database can be provided. This approach could be used to embed the attribute service in the provider. In various embodiments, the attribute service could be a plugin to the SCM. In other embodiments, the attribute service could be incorporated into the provisioning information distributed by SCMs. In yet another embodiment, the attribute service could be deployed inside an administration server.

The attribute service can be designed to scale to provide acceptable performance while servicing many providers simultaneously. Caching can be used within providers and possibly within the attribute service to improve performance. However, any caching in the attribute service can be expired or updated upon changes to the data to guarantee that only valid data is returned to the authorization and role mapping providers. Also, connection pooling by providers may be necessary to leverage multiple instances of the attribute service.

The SCM 400 can be used for retrieving and setting configuration information in authentication providers. In aspects of these embodiments, security providers—themselves plugins into the SSM—can also support their own dynamic plugins. By way of illustration, the authentication provider can include support for custom "provider" extension points. A provider extension handler class 504 can manage provider extensions 508 by loading them on initialization and unloading them on shutdown. References to provider extension class methods can be stored in a map and executed when needed. The configuration for a provider can contain a class name for each provider extension. That class can implement the method(s) for the type of provider extension it is configured for as well as initialize( ) and shutdown( ) methods. In this way, new functionality can be added to security providers without requiring the provider itself to be modified.

Figure 6:
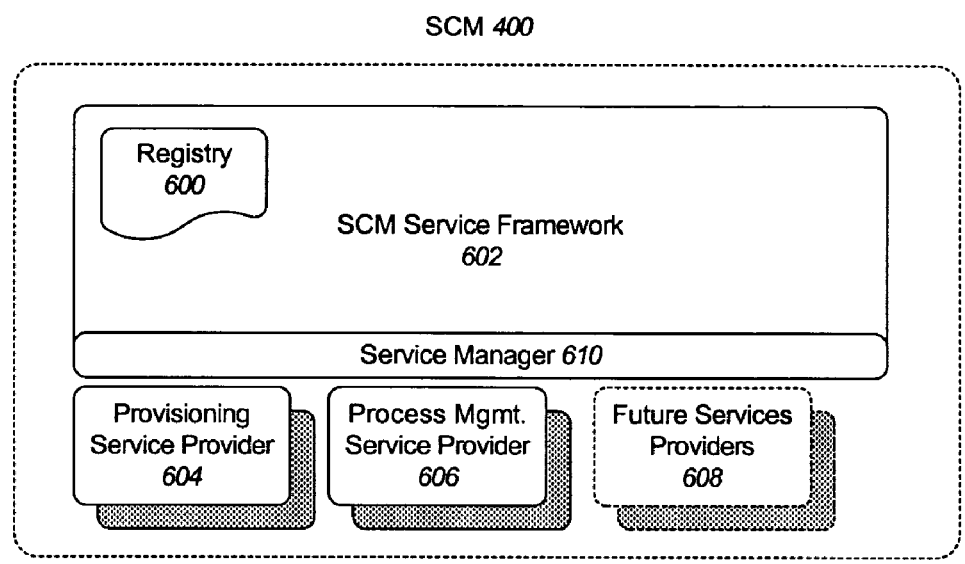
FIG. 6 is an illustration of an exemplary security control module service framework in accordance to various embodiments of the invention.

FIG. 6 is an exemplary illustration of an SCM service framework in accordance with various embodiments of the invention. Although this diagram depicts objects/processes as logically separate, such depiction is merely for illustrative purposes. It will be apparent to those skilled in the art that the objects/processes portrayed in this figure can be combined or divided into separate software, firmware and/or hardware components. Furthermore, it will also be apparent to those skilled in the art that such objects/processes, regardless of how they are combined or divided, can execute on the same computing device or can be distributed among different computing devices connected by one or more networks or other suitable communication means.

In various embodiments, an SCM 400 can include an extensible service framework 602 that provides services to other processes through inclusion of one or more service providers. In this illustration, a provisioning service provider 604 and a process management service provider 606 are shown. Many other service types are possible and can, by way of an example, encompass performance monitoring, event monitoring, configuration and resource discovery. In various embodiments and by way of illustration, the SCM service is a component framework that can facilitate the development of SCM agents from a set of independent but cooperating components or services. By way of illustration, service providers can be exposed via a SOAP interface.

In various embodiments, the service framework can define the lifecycle of service providers (e.g., initialization, commencement, termination, etc.) as well as how they can locate and interact with each other. In addition, the service framework can support the static and dynamic configuration of service providers. New service providers 608 can be added as needed. By way of illustration, the service framework can expose an SPI that service providers implement in order to integrate themselves into the service framework. By way of illustration, service framework and service provider configurations can be stored in an XML file that can be parameterized at installation.

In various embodiments, a service manager 610 can be used to intermediate between the service framework and services. The service manager instantiates each service provider and equips each with a service context that allows the provider to interact with the service SSM. The service SSM can also contain an in-process registry 600 in which services can be registered. By way of illustration, the SCM can be managed by a platform-specific process such as an embeddor (a system agent on Microsoft Windows® systems) or a daemon (on Unix® systems). Such a process can monitor the SCM and ensure the high availability of the SCM and its services. The SCM can provide other core functionality to services, such as configuration and logging.

The process management service provider (PMSP) 606 can start and stop processes and monitor one process on behalf of another, restarting it in the event of a crash, or stopping it when the requesting parent process exits. This capability greatly improves the manageability and reliability of the system. In various embodiments, SCMs can utilize the PMSP to manage one or more out-of-process SSMs. Security providers can also use the PMSP to start, stop, and monitor authorization and role mapping providers instances.

The provisioning service provider (PSP) 604 is responsible for maintaining provisioning information for all SSMs associated with the SCM. In various embodiments, the PSP exposes two services, one for processing provisioning requests from distributors and another for processing queries from SSMs. In various embodiments, the PSP can accept provisioning information for the set of all SSMs within a single administration domain from the distributor that, in one embodiment, are collocated on the same system as the SCM. In various embodiments, the PSP can associate a provisioning information version number with each SSM it is aware of. By way of illustration, on startup the PSP can contact a distributor, passing the version numbers of SSMs it is aware of. If necessary, the distributor can then send updates required to bring each SSM's provisioned information up-to-date. Thereafter, the PSP can listen for updates from the distributor and update a local persistent store accordingly. Each SSM can retrieve its current provisioning information at any time by querying the PSP via a information client query.

In various embodiments, SCM service providers can optionally establish trust relationships with other processes such as the distributor. By way of illustration, each trust relationship can be established by the creation of a public/private key pair that is created and registered when the SCM is installed. The SCM can retain the following information in order to establish trust relationship:

Private key and X.509 digital certificate for the SCM in a local keystore; and

X.509 certificates to any process with which the SCM has established a trust relationship. The X.509 certificate can be stored in a local keystore under an alias that is the unique identifier associated with the trusted process.

Figure 7:
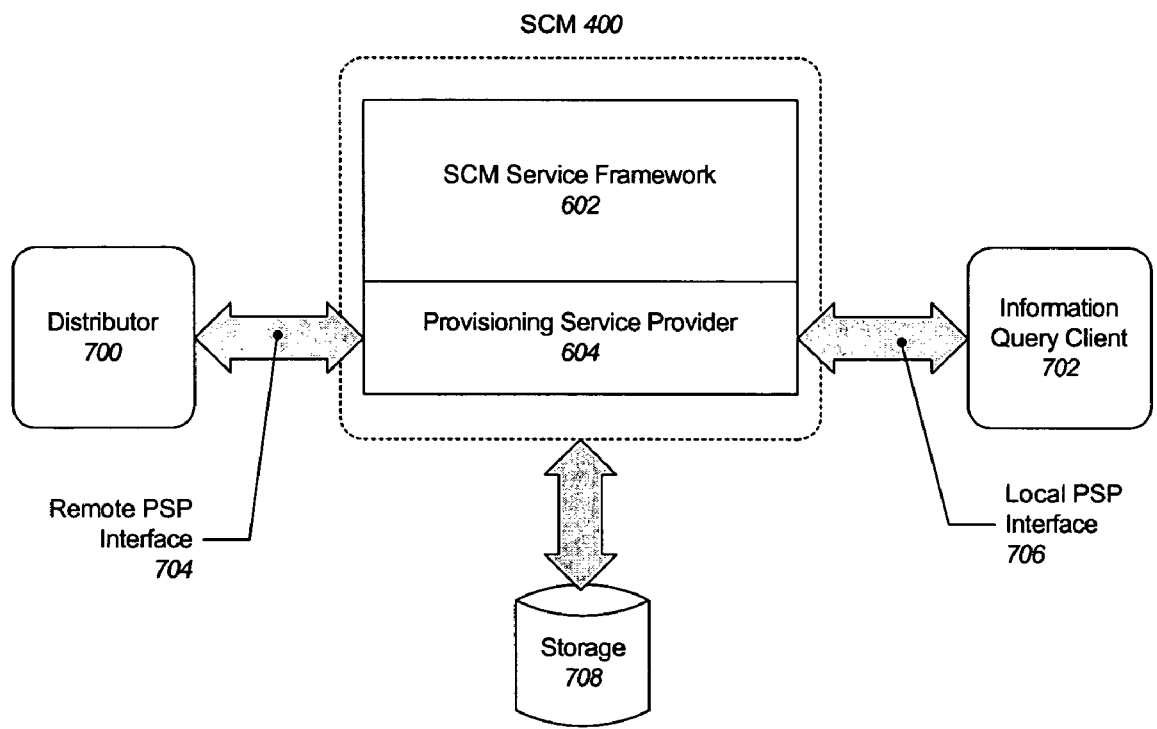
FIG. 7 is an illustration of an exemplary provisioning service provider in accordance to various embodiments of the invention.

FIG. 7 is an exemplary illustration of a provisioning service provider in accordance to various embodiments of the invention. Although this diagram depicts objects/processes as logically separate, such depiction is merely for illustrative purposes. It will be apparent to those skilled in the art that the objects/processes portrayed in this figure can be combined or divided into separate software, firmware and/or hardware components. Furthermore, it will also be apparent to those skilled in the art that such objects/processes, regardless of how they are combined or divided, can execute on the same computing device or can be distributed among different computing devices connected by one or more networks or other suitable communication means.

With reference to FIG. 7 and in various embodiments, the PSP 604 exposes remote 704 and local 706 interfaces. In various embodiments, the remote PSP interface can be used to exchange information with one or more distributors 700. By way of illustration, an interface can include one or more of: a programmatic interface (e.g., class, method and/or function definitions), a communication interface such as a web service (e.g., SOAP over HTTP(S)), other suitable mechanism(s) for exchanging messages, and a protocol for invoking functionality and/or exchanging information. By way of illustration, an interface can be implemented as XML over SOAP and can be optionally secured using transport layer security protocol (TLS). However, the present disclosure is not limited to or dependent on any interface implementation presently known or yet to be developed, as will be appreciated by those of skill in the art.

In various embodiments, the local PSP interface 706 can be used to exchange information with one or more information query clients 702. An information query client encapsulates interaction with the local PSP interface from other processes and, by introducing a level of indirection, makes other processes less dependent on the implementation details of the local PSP interface. By way of illustration, an information query client can be implemented as an object that exposes one or more services through which other processes can communicate with a provisioning service.

The PSP is capable of receiving updates to provisioning information through the remote PSP interface. The updates can be full or incremental and can be propagated by distributor(s) (or other suitable processes). In various embodiments, the SCM can maintain provisioned information for all SSM instances for which it is responsible. The SCM can receive and store provisioned information updates in a local persistent store 708, and make it available to SSMs via one or more clients. In various embodiments, the provisioning mechanism ensures that only the provisioned information required by an SCM is provisioned to that SCM. Likewise, the SCM can ensure that only the provisioned information required by an SSM is made available to that SSM. In various embodiments, an atomic set of provisioned information updates can be transactional across all SCMs; that is, an update can take effect only if all SCMs are able to successfully process the update. This ensures that all provisioning within an administration domain is consistent across all running SCMs within that domain.

In various embodiments, Jakarta Phoenix can serve as the SCM service framework. Phoenix is a micro-kernel designed and implemented on top of the Jakarta Avalon. It provides a number of facilities to manage the environment of server applications. Such facilities include log management, class loading, and thread management. The Jakarta API defines a standard method of piecing together server components to create a server. Furthermore, since they are built on top of Jakarta Avalon, Phoenix applications automatically take advantage of the standard code design patters, rules and guidelines dictated by Avalon that increase the modularity and reuse of software components. In various embodiments, an SCM process can be managed by a Java® Service Wrapper (JSW) process. The JSW monitors a JVM process and automatically restarts it if that JVM crashes or hangs. This makes it possible to install the SCM as a Windows® NT Service or as a UNIX® daemon, allowing it to be automatically started upon system reboot.

Figure 8:
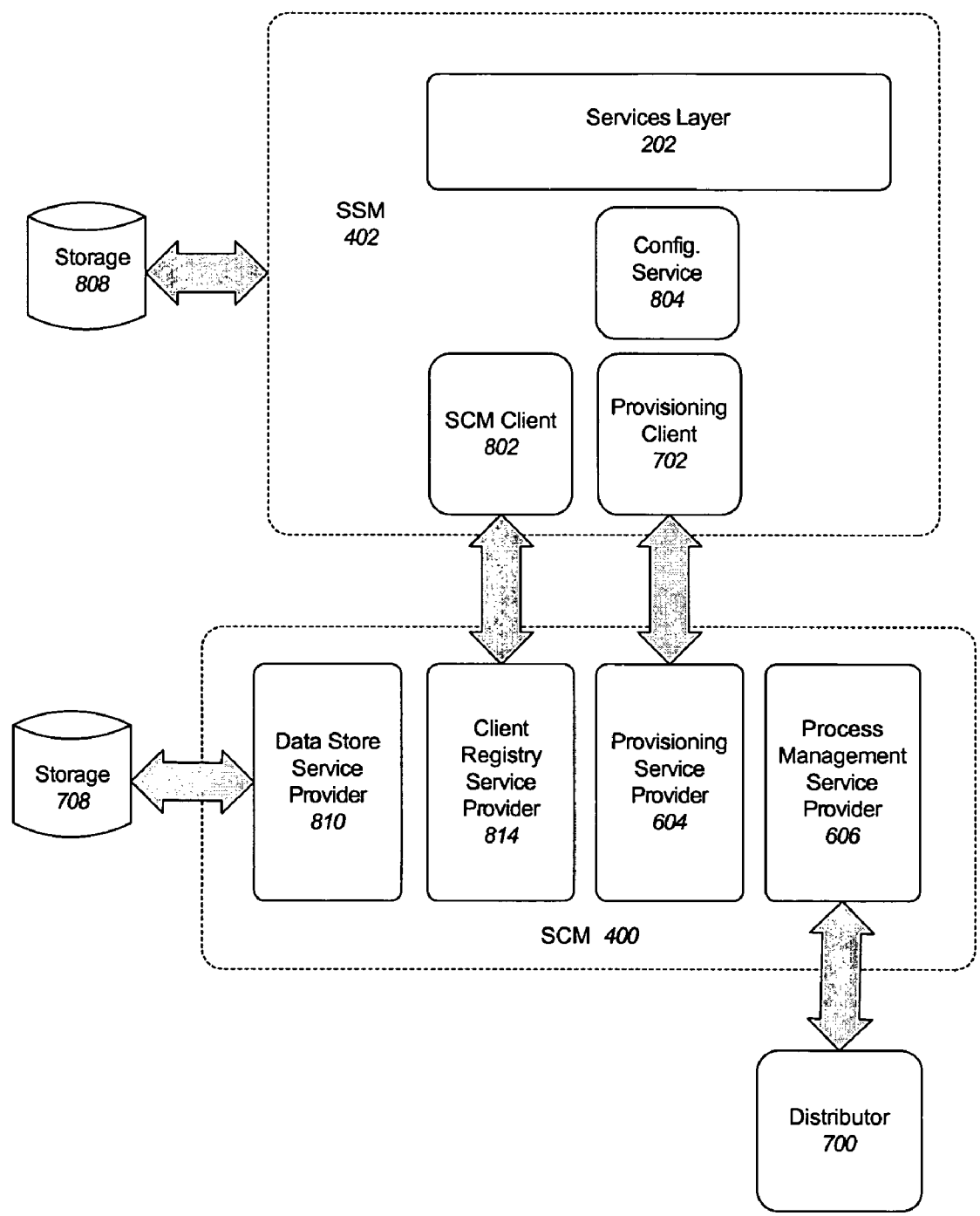
FIG. 8 is an illustration of exemplary security service module and security control module interaction possibilities in accordance to various embodiments of the invention.

FIG. 8 is an exemplary illustration of SSM and SCM interaction possibilities in accordance to various embodiments of the invention. Although this diagram depicts objects/processes as logically separate, such depiction is merely for illustrative purposes. It will be apparent to those skilled in the art that the objects/processes portrayed in this figure can be combined or divided into separate software, firmware and/or hardware components. Furthermore, it will also be apparent to those skilled in the art that such objects/processes, regardless of how they are combined or divided, can execute on the same computing device or can be distributed among different computing devices connected by one or more networks or other suitable communication means.

In various embodiments, an SSM 402 includes a services layer 202 having associated security providers (not shown), a configuration service 804, and several clients (802, 702) for communication with an SCM 400. Security providers and other processes can obtain configuration information via the configuration service, which exposes services to allow a security provider to configure itself on start-up and dynamically thereafter. The configuration service encapsulates an implementation capable of retrieving this information—thus insulating security providers from implementation details. By way of illustration, a configuration service can be implemented as an object that exposes one or more simple methods through which other processes can communicate with a provisioning service provider. In aspects of these embodiments and by way of illustration, the services layer 202 can instantiate a new configuration service during initialization and pass it to one or more security providers through an initialization method. Both the service layer and its providers can query the configuration service at any time for configuration information.

In various embodiments, the configuration service 804 allows security providers to retrieve their current provisioning information from provisioning service provider 604 via information query client 702. In aspects of these embodiments and by way of illustration, provisioning information can be represented as scoped name-value pairs of text strings (e.g., an XML document). In various embodiments, additional implementations could be developed that retrieve configuration and policy data from alternative sources (e.g., a JMX MBean server). In various embodiments, the configuration service can cache provisioning information in a persistent store 808. Caching prevents unnecessary calls to the SCM at startup and reduces the amount of information transferred between the SCM and SSMs.

In various embodiments, security providers can use the PMSP 606 in order to start, stop, and monitor other processes. By way of illustration, on startup an SCM can use PMSP to start SSMs. In one embodiment, a process management client (not shown) can encapsulate interaction with the PMSP thus making security providers less dependent on the implementation details of the protocol used to communicate with the PMSP. By way of illustration, a processes management client can be implemented as an object that exposes one or more services through which other processes can communicate with a PMSP.

In various embodiments, the SCM client 802 allows the SSM to interact with the SCM by instantiating clients. By way of illustration, an SSM can first create an instance of the SCM client, and then invoke functionality on the SCM client to retrieve clients to other SCM services (e.g., provisioning). The SCM can maintain a client registry service provider (CSRP) 814 that manages information regarding the SSMs that are currently using the SCM.

The SCM client encapsulates interaction with a CSRP from other processes and, by introducing a level of indirection, makes other processes less dependent on the implementation details of the local PSP interface. By way of illustration, a SCM client can be implemented as an object that exposes one or more services through which other processes can communicate with a CSRP. In aspects of these embodiments, the CSRP can maintain a map of SSM status information. The status information can include, but is not limited to, an SSM's start time and total operation time. In further aspects, the client registry service can expose functionality for enumerating running SSMs and retrieving SSM status. For example, the service can allow other components/processes to register for SSM status update notifications. The service can also expose an interface that can receive heartbeat messages from SSM clients.

In various embodiments, the SCM service framework can include a data store service provider 810 which can be used to implement a persistent cache of provisioned information. This service can expose basic create, read, update and delete (CRUD) functionality. By way of illustration, the service can persist information in a file system, a database, and any other suitable storage means. In aspects of these embodiments, the data store service provider implements an SPI compatible with the SCM service SSM. By way of illustration, the data store service provider can be used both by the SCM and by SSMs or other processes.

The SSM allows processes to leverage services offered through security provider modules. By the same token, the SSM's flexible infrastructure also allows security vendors, integrators, and users to provide their own custom security provider modules. Secure provider modules can be mixed and matched to create unique security solutions, allowing organizations to take advantage of new technology advances in some areas while retaining proven methods in others. Thanks to the use of SCMs to distribute provisioning information, a security solution embodied in a particular SSM configuration can be painlessly scaled to suit large or small deployments.

Figure 9:
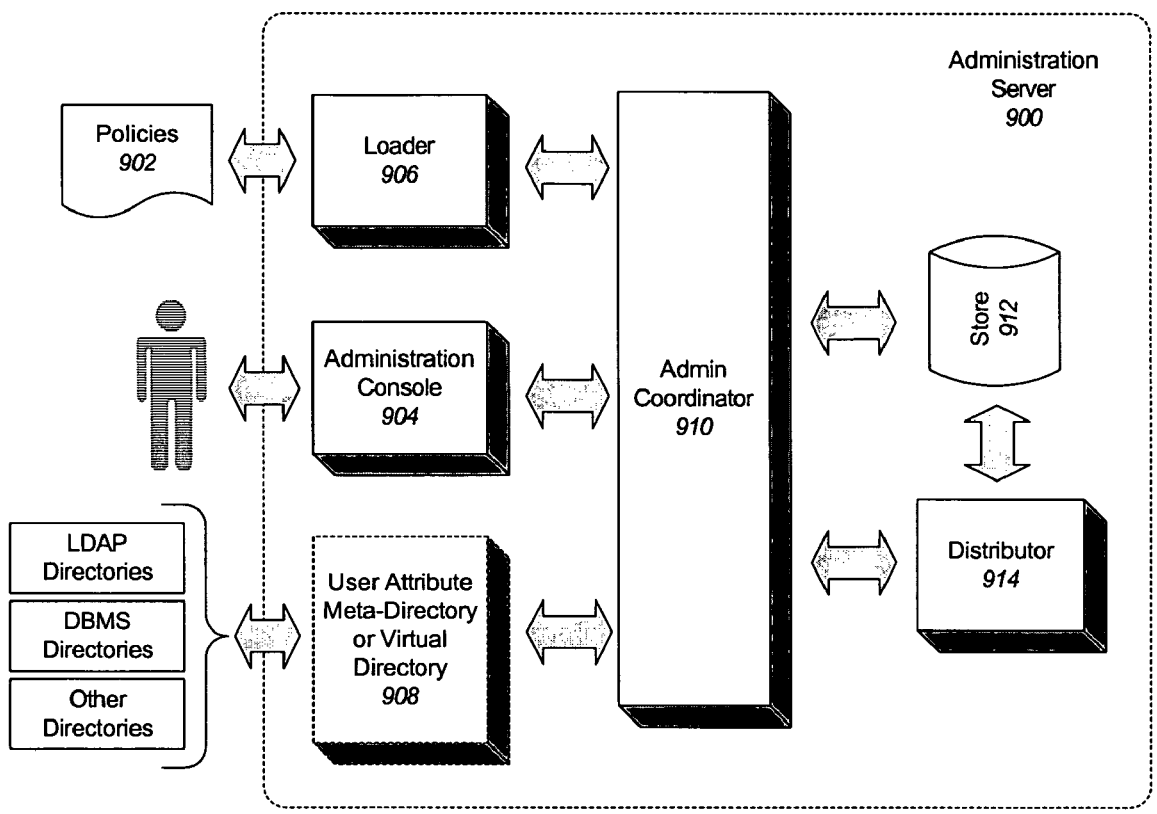
FIG. 9 is an illustration of an exemplary administration console and server in accordance to various embodiments of the invention.

FIG. 9 is an exemplary illustration of an administration server in accordance to various embodiments of the invention. Although this diagram depicts objects/processes as logically separate, such depiction is merely for illustrative purposes. It will be apparent to those skilled in the art that the objects/processes portrayed in this figure can be combined or divided into separate software, firmware and/or hardware components. Furthermore, it will also be apparent to those skilled in the art that such objects/processes, regardless of how they are combined or divided, can execute on the same computing device or can be distributed among different computing devices connected by one or more networks or other suitable communication means.

In various embodiments, the administration server includes an administration coordinator 910 to harmonize activities of the various administration server components. In aspects of these embodiments, the administration server 900 includes an administration console 904 ("console") that allows administrative users to easily configure and manage various aspects of the system through a unified management user interface. Configuration information is cached in storage 912 for use by the distributor 914. Configuration settings for security provider modules can be viewed and modified in the console wherein modifications to configuration information can be automatically propagated back to the effected security provider module(s). Through the console, SCMs and SSMs can be deployed on specific machines. The console can also be used to associate an SSM with an SCM and specify the security provider modules that a given SSM will utilize. In various embodiments, if an SSM has not been associated with an SCM, the SSM can either dynamically associate with an SCM through a discovery procedure or instantiate a new SCM process to associate with.

In aspects of these embodiments, the administration console includes a user interface (not shown). By way of a non-limiting example, a user interface can include one or more of the following: 1) a graphical user interface (GUI) (e.g., rendered with Hypertext Markup Language) rendered on a display device or projected onto a user's retina; 2) an ability to respond to sounds and/or voice commands; 3) an ability to respond to input from a remote control device (e.g., a cellular telephone, a PDA, or other suitable remote control); 4) an ability to respond to gestures (e.g., facial and otherwise); 5) an ability to respond to commands from a process on the same or another computing device; and 6) an ability to respond to input from a computer mouse and/or keyboard. This disclosure is not limited to any particular UI. Those of skill in the art will recognize that many other user interfaces are possible and fully within the scope and spirit of this disclosure.

In various embodiments, a loader 906 imports policy definitions 902 from one or more files, databases, other systems, or from any other suitable source(s), into storage 912. The loader can extract the definitions itself or enlist the help of one or more additional processes (not shown). Security policies frequently need more information than simple identity data to resolve sophisticated policy decisions. In various embodiments, an optional meta-directory or virtual directory 908 is provided to access and synchronize user attributes from a variety of sources to support these policies. Since these attributes may not be stored in any single place, this directory serves to integrate attributes for each user and cache them in storage 912 for use by SSMs. The meta-directory or vitual directory can integrate information from a variety of sources, including (but not limited to), application databases, Lightweight Directory Access Protocol (LDAP) directory servers, network databases, and others suitable sources. The distributor 914 utilizes information in the storage 912 to provide SCMs with policy and configuration information relevant to their SSMs.

Figure 10:
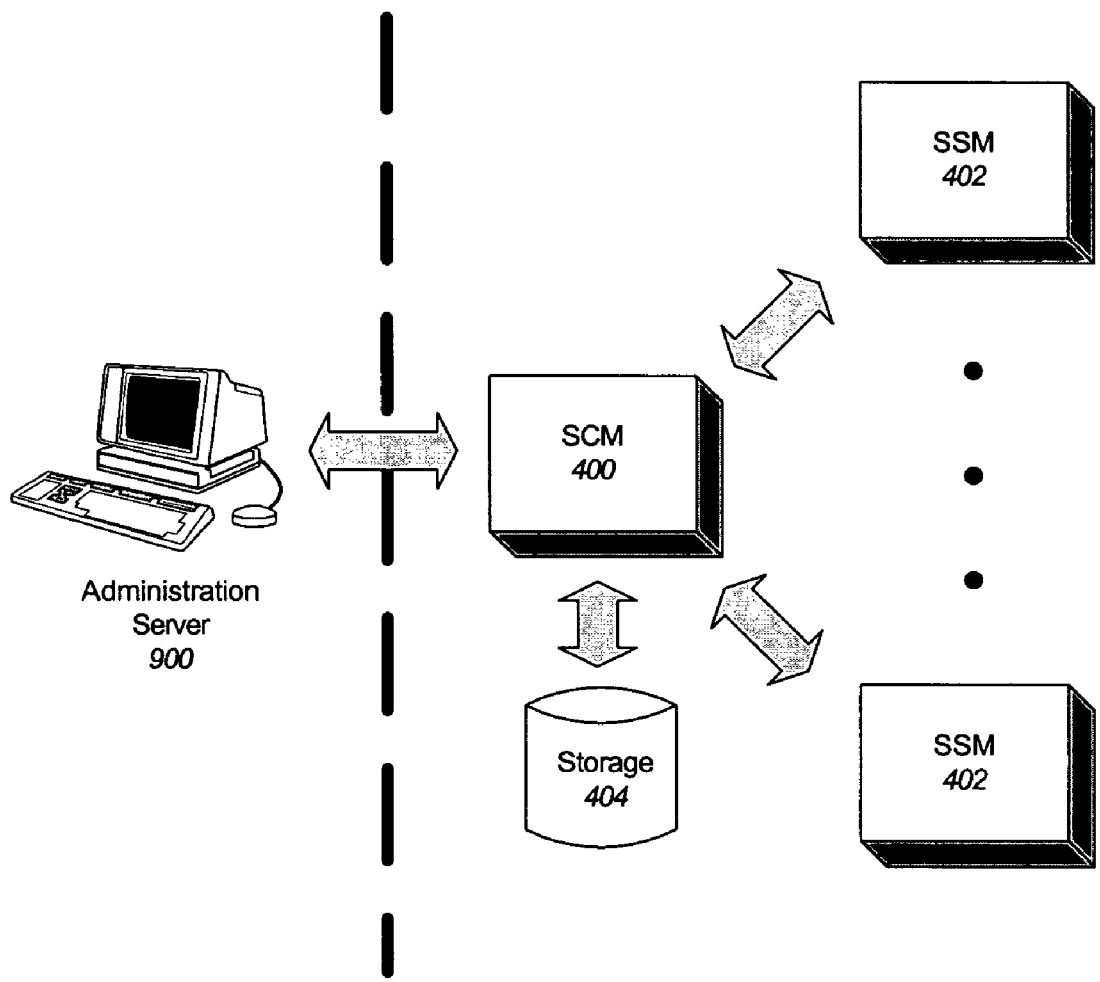
FIG. 10 is an exemplary illustration of system components in accordance to various embodiments of the invention.

FIG. 10 is an exemplary illustration of system components in accordance to various embodiments of the invention. Although this diagram depicts objects/processes as logically separate, such depiction is merely for illustrative purposes. It will be apparent to those skilled in the art that the objects/processes portrayed in this figure can be combined or divided into separate software, firmware and/or hardware components. Furthermore, it will also be apparent to those skilled in the art that such objects/processes, regardless of how they are combined or divided, can execute on the same computing device or can be distributed among different computing devices connected by one or more networks or other suitable communication means.

The system can employ a fully-distributed security enforcement architecture consisting of SSMs 402 embedded in applications, application servers, web servers, and hardware, throughout an enterprise. To facilitate the management of a potentially large number of distributed SSMs, the administration server 900 uses a remote administration mechanism to distribute configuration data to each SSM. In various embodiments, the SCM 400 is a component of this remote administration mechanism. Each SCM is responsible for storing 404 and maintaining policy and configuration information for all SSMs that it is associated with. In one embodiment, an SCM is associated with the SSMs on its local machine. When a change to an SSM's configuration or policy is made and distributed from the administration console, an SCM receives the change and updates its cached copy of the configuration. The change is then propagated to the SSM which can adapt to the configuration change dynamically or at a later time. In addition to facilitating management, the SCM enables SSMs to operate in the absence of the administration server. Since SCMs maintain a persistent copy of each configuration, new SSMs can be started and existing SSMs can continue to function, even if the Administration server goes down.

Figure 11:
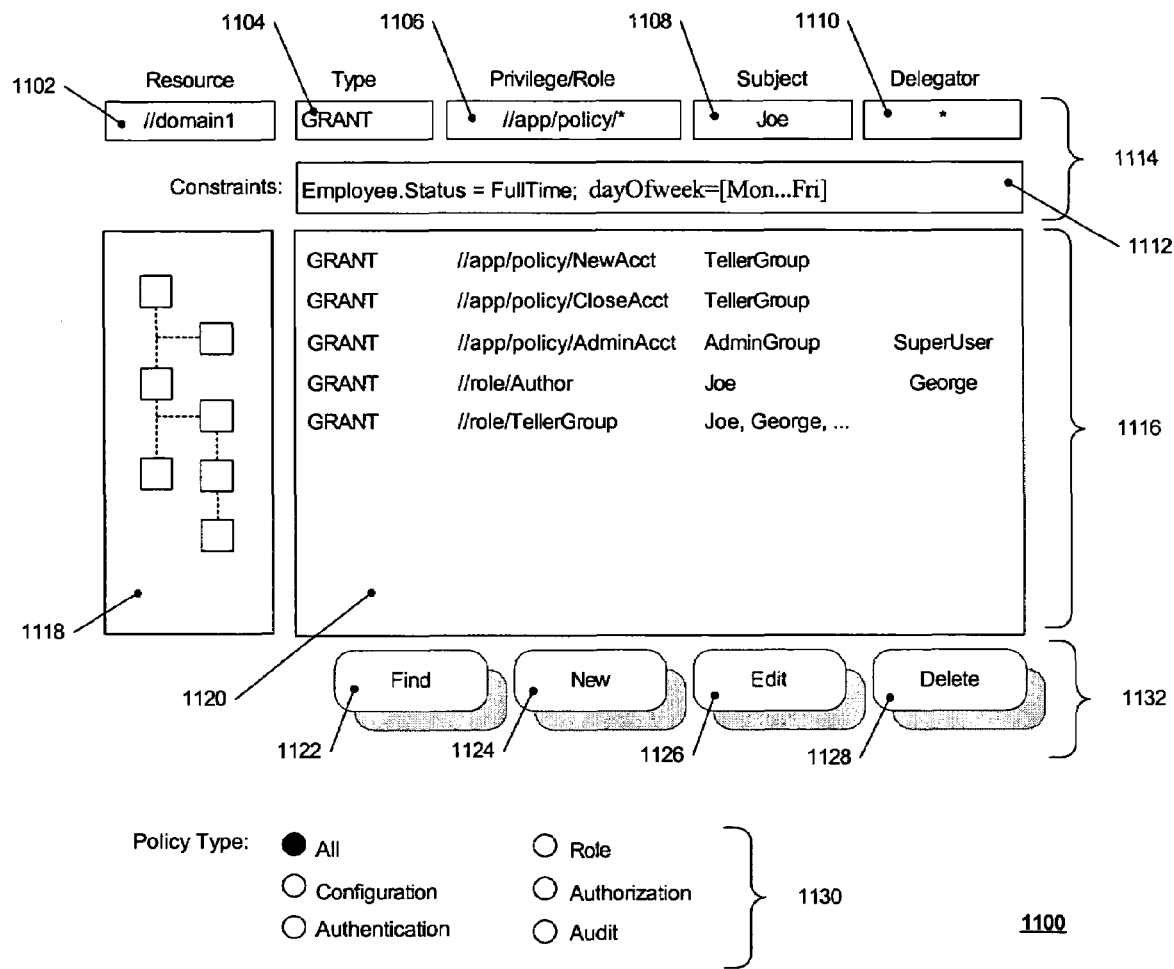
FIG. 11 is an illustration of exemplary policy analysis functionality of the administration console in accordance to various embodiments

FIG. 11 is an exemplary illustration of policy analysis functionality of the administration console in accordance to various embodiments. The administration console has a policy tool user interface 1100 that allows users to create, modify, delete and query policies in the system. The policy tool has four main areas: a query region 1114 for providing search criteria, a results list 1116 for viewing results of a search, an action area 1132 including buttons 1122-1128 for operating on policies, and a policy type filter area 1130 for optionally filtering out results from the results list. In aspects of these embodiments, results in the result list can be sorted by columns.

The query region allows a user to find policies by specifying zero or more policy components as search criteria. In various embodiments, policy components can be specified as text strings. All policies having matching components to those specified by the user are included in the results list. User-specified components can include more than one value, and can include wild cards (e.g., "*" matches everything) to allow for pattern matching. The user can specify the following policy components: zero or more resources 1102, zero or more policy types 1104 (e.g., GRANT, DENY, DELEGATE), zero or more privilege or role name(s) 1106, zero or more subject name(s) 1108, zero or more delegator names 1110, and zero or more constraints 1112. In aspects of these embodiments, constraints can be specified in the same manner they are specified in policy definitions. The resource 1102 can be specified as one or more text strings or can be interactively chosen from a graphical (tree) representation of a resource hierarchy 1118.

By way of illustration, if user named Joe wanted to find all policies that effect him. Joe would specify the root of the resource hierarchy in 1102 or 1118, or alternatively he would specify a wild card "*" in text field 1102. Alternatively, if Joe wanted to see what policies where applicable to him for specific resources, he could specify those resources in 1102 or 1118. In the subject field, Joe specifies his user name and, optionally, any roles and/or groups he belongs to. By hitting the return key or by selecting the Find button 1122 or other suitable action, a search commences and all applicable policies are displayed in the results list. Alternatively, the results list could be dynamically updated as search parameters are entered. Joe could refine the results using policy type filters 1130. For example, by selecting "All" (the default) all policies are displayed. But results can be limited to any combination of policy type, including but not limited to: configuration, authentication, role, authorization and audit.

Since the subject component for policies can include roles, the policy tool first discovers all of the applicable role policies for users and groups specified in the subject field 1108. Then, the policy tool can perform the search using the user-specified criteria but with the addition of any discovered roles to the subject component. In addition, policy inheritance on the selected resource(s) is taken into account. In aspects of these embodiments, the policy tool can utilize the SSM API to map users and groups to roles, and to select policies that satisfy the user specified criteria.

In various embodiments, the rows in the results list correspond to policies wherein one or more policies can be selected. Selected policies can be modified by, for example, further selecting the Edit button 1126. In aspects of these embodiments, selection of the edit button can cause an a policy editor window to appear in which selected policies can be edited. In further aspects of these embodiments, a policy can be edited in place in the results list. Or the selected policies can be deleted by further selecting the Delete button 1128. New policies can be added by selection of the New button 1124, which can cause a policy editor window to appear.

By way of further illustration, the policy tool can be used to find all policies delegated to a particular subject. By way of example, this can be accomplished by putting the user's name in the subject field 1108, and a wildcard "*" in the delegator field 1110. This will find all policies where a delegation has been made to the user (or a role the user is in). Likewise, the policy tool can be used to find all policies that have been delegated by a particular user. For example, the user's name can be provided in the delegator field and a wildcard can be placed in the subject field.

Figure 12:
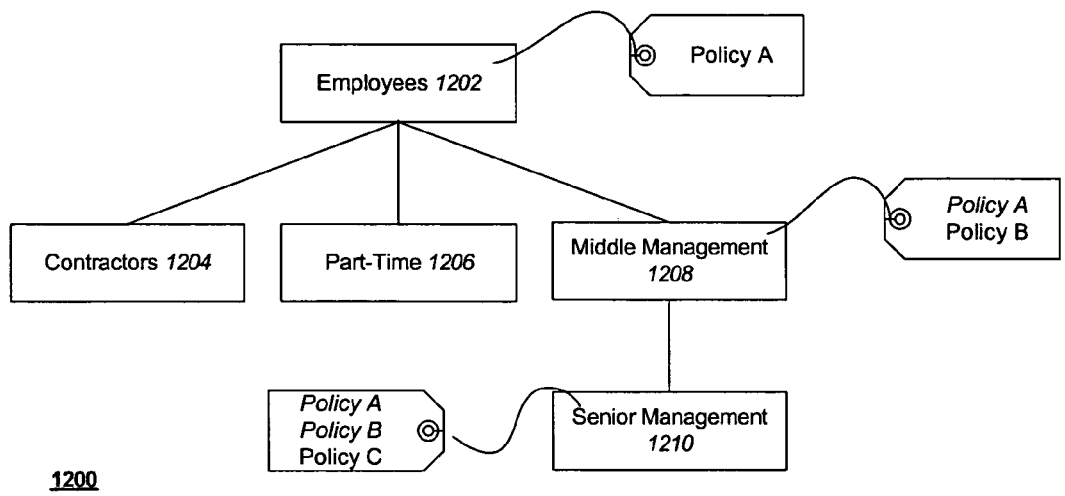
FIG. 12 is an illustration of an exemplary user group hierarchy in accordance to various embodiments.

FIG. 12 is an exemplary illustration of a user group hierarchy in accordance to various embodiments. A group is a collection of users that can share some common property, such as a department, a job function, or a job title. By way of illustration, a group named Accounting might contain users in the accounting department. It is important to realize that this does not directly reflect what access rights they have. That depends on the policies defined for the group for a particular resource. A group can contain users or other groups; users who are assigned to a group are called group members. Nested memberships of groups within a group form a hierarchy 1200. A policy whose subject component includes a group is the same as defining the policy for each user who is a member of the group. By using groups, there is no need to define policy for each and every user; instead, each user in a group inherits the policies applied to the group; this rule also applies to nested groups. In aspects of these embodiments, group policy inheritance is accomplished by automatically assigning parent group policies to its nested group(s).

Referring to FIG. 12, users or groups inherit the policies of any group to which they belong, either directly or indirectly through the group to which they are assigned. When group inherits policies from other groups, usually the parent group has fewer access privileges than its nested group(s). By way of illustration, the Employees group 1202 has three nested groups: Contractors 1204, Part-Time 1206 and Middle Management 1208. The Middle Management group has one nested group, Senior Management 1210. The Employees group is the subject of Policy A (indicated by the tag attached to the group name). The Middle Management group is the subject of Policy B, but also becomes a subject of Policy A through inheritance from the Employees group. Likewise, the Senior Management group is the subject of Policy C and, through inheritance, Policies A and B.

In various embodiments, the administration console provides one or more user interfaces for creating, reading, updating and deleting users and groups, and for nesting groups within groups. Furthermore, attributes associated with users and groups can also be created, read, updated and deleted from the console.

Various embodiments can be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention can also be implemented by the preparation of integrated circuits or by interconnecting an appropriate network of conventional component circuits, as can be readily apparent to those skilled in the art.

Various embodiments include a computer program product which is a storage medium (media) having instructions stored thereon/in which can be used to program a computer to perform any of the embodiments presented herein. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software can include, but is not limited to, device drivers, operating systems, execution environments/containers, and applications.

The foregoing description of the preferred embodiments of the present invention has been provided for the purposes of illustration and description. It is not intended to be exhaustive or to limit the invention to the precise forms disclosed. Many modifications and variations will be apparent to the practitioner skilled in the art. Embodiments were chosen and described in order to best describe the principles of the invention and its practical application, thereby enabling others skilled in the art to understand the invention, the various embodiments and with various modifications that are suited to the particular use contemplated. It is intended that the scope of the invention be defined by the following claims and their equivalents.

What is claimed is:

1. A method for providing a security provider, said method comprising:
providing an enterprise system that includes a plurality of components wherein the components are distributed in the enterprise system;
providing an administration server that provides policy and configuration information;
providing a plurality of security service modules (SSMs), wherein each SSM includes
an adaptation layer which includes an application program interface,
a framework layer which is below the adaptation layer,
a services layer, below the framework layer;
wherein the plurality of SSMs run on a plurality of computers distributed throughout an enterprise and each SSM is integrated with and provides security for a component, from the plurality of components, running on the same computer with that SSM and wherein each SSM receives provisioning information relevant to that SSM;
providing a framework program interface (FPI) that is included in the framework layer and wherein the adaptation layer uses the FPI to invoke services of the framework layer;

providing a service provider interface (SPI) that is included in the framework layer, wherein the framework layer uses the SPI to invoke one or more dynamically configurable security services on the services layer and exposes the one or more dynamically configurable security services to the application program interface;

providing the one or more dynamically configurable security services wherein each of the one or more dynamically configurable security services provides one authentication, authorization, auditing, role mapping and credential mapping service;

providing at least one security provider which is a set of the one or more dynamically configurable security services and wherein the at least one security provider can be dynamically integrated into each of the plurality of SSMs;

providing a plurality of security control managers (SCMs) each executing on a different computer with at least one SSM;

wherein each SCM receives the policy and configuration information from the administration server and provisions the policy and configuration information only to SSMs executing on the same computer with that SCM; and wherein each SCM includes an extensible framework including one or more service providers wherein one of the service providers is a provisioning service provider that provisions the policy and configuration information to the SSMs.

2. The method of claim 1, further comprising:
providing a configuration schema for the security provider.

3. The method of claim 1 wherein:
the security provider is capable of receiving configuration information at run-time.

4. The method of claim 1 wherein:
the service provider interface can include one or more of: a programmatic interface, a protocol, and a mechanism for exchanging messages.

5. The method of claim 1 wherein:
the application program interface can include one or more of: a programmatic interface, a protocol, and a mechanism for exchanging messages.

6. The method of claim 1 wherein:
each security service module is capable of integrating a plurality of security providers each of which implement a service provider interface.

7. The method of claim 1 wherein the plurality of components are network hardware components.

8. The method of claim 1 wherein the plurality of components are application servers.

9. The method of claim 1 wherein the plurality of components includes one or more web servers and proxy servers.

10. A computer readable medium having instructions stored thereon to cause a system to:
provide an enterprise system that includes a plurality of components wherein the components are distributed in the enterprise system;
provide an administration server that provides policy and configuration information;
provide a plurality of security service modules (SSMs), wherein each SSM includes
an adaptation layer which includes an application program interface,
a framework layer which is below the adaptation layer,
a services layer, below the framework layer;
wherein the plurality of SSMs run on a plurality of computers distributed throughout an enterprise and each SSM is integrated with and provides security for a component, from the plurality of components, running on the same computer with that SSM and wherein each SSM receives provisioning information relevant to that SSM;

provide a framework program interface (FPI) that is included in the framework layer and wherein the adaptation layer uses the FPI to invoke services of the framework layer;

provide a service provider interface (SPI) that is included in the framework layer, wherein the framework layer uses the SPI to invoke one or more dynamically configurable security services on the services layer and exposes the one or more dynamically configurable security services to the application program interface;

provide the one or more dynamically configurable security services wherein each of the one or more dynamically configurable security services provides one authentication, authorization, auditing, role mapping and credential mapping service;

provide at least one security provider which is a set of the one or more dynamically configurable security services and wherein the at least one security provider can be dynamically integrated into each of the plurality of SSMs;

provide a plurality of security control managers (SCMs) each executing on a different computer with at least one SSM;

wherein each SCM receives the policy and configuration information from the administration server and provisions the policy and configuration information only to SSMs executing on the same computer with that SCM; and wherein each SCM includes an extensible framework including one or more service providers wherein one of the service providers is a provisioning service provider that provisions the policy and configuration information to the SSMs.

11. The computer readable medium of claim 10, further comprising instructions stored thereon that cause the system to:
provide a configuration schema for the at least one security provider.

12. The computer readable medium of claim 10, further comprising instructions stored thereon that cause the system to:
integrate the at least one security provider into one of the plurality of SSMs at run-time.

13. The computer readable medium of claim 10 wherein:
the security provider is capable of receiving configuration information at run-time.

14. The computer readable medium of claim 10 wherein:
the service provider interface can include one or more of: a programmatic interface, a protocol, and a mechanism for exchanging messages.

15. The computer readable medium of claim 10 wherein:
the application program interface can include one or more of: a programmatic interface, a protocol, and a mechanism for exchanging messages.

16. The computer readable medium of claim 10 wherein:
each SSM is capable of integrating a plurality of security providers each of which implement a security provider interface.

17. The computer readable medium of claim 10 wherein the plurality of components are network hardware components.

18. The computer readable medium of claim 10 wherein the plurality of components are application servers.

19. The computer readable medium of claim 10 wherein the plurality of components includes one or more web servers and proxy servers.

20. A distributed security system comprising:
- an enterprise system that includes a plurality of components wherein the components are distributed in the enterprise system;
- a plurality of computers, each with a processor operating thereon;
- an administration server that provides policy and configuration information;
- a plurality of security service modules (SSMs), executing on the plurality of computers distributed throughout an enterprise, wherein each SSM includes an adaptation layer, a framework layer, and a services layer;
- a framework program interface (FPI) included in the framework layer, wherein the adaptation layer uses the FPI to invoke services of the framework layer;
- a service provider interface (SPI) that is included in the framework layer;
- a plurality of security providers, wherein each security provider includes a plurality of related security services, and wherein each SSM includes at least one security provider;
- wherein each SSM provides security services to a component, from the plurality of components, executing on a computer with that SSM and wherein the provided security services include any security services included in the at least one security provider included with that SSM;
- a plurality of security control managers (SCMs) each executing on a different computer with at least one SSM;
- wherein each SCM receives the policy and configuration information from the administration server and provisions the policy and configuration information only to SSMs executing on the same computer with that SCM; and
- wherein each SCM includes an extensible framework including one or more service providers wherein one of the service providers is a provisioning service provider that provisions the policy and configuration information to the SSMs.

21. The system of claim 20 wherein the plurality of components are network hardware components.

22. The system of claim 20 wherein the plurality of components are application servers.

23. The system of claim 20 wherein the plurality of components includes one or more web servers and proxy servers.

* * * * *

UNITED STATES PATENT AND TRADEMARK OFFICE
CERTIFICATE OF CORRECTION

| | | |
|---|---|---|
| PATENT NO. | : 7,603,548 B2 | Page 1 of 1 |
| APPLICATION NO. | : 10/961675 | |
| DATED | : October 13, 2009 | |
| INVENTOR(S) | : Paul Patrick et al. | |

It is certified that error appears in the above-identified patent and that said Letters Patent is hereby corrected as shown below:

Title page, item (*) Notice: should read as follows: Subject to any disclaimer, the term of this patent is extended or adjusted under 35 U.S.C. 154(b) by 851 days.

In column 2, line 32, delete "Dec. 12, 2002;" and insert -- Dec. 12, 2002. --, therefor.

In column 3, line 37, delete "embodiments" and insert -- embodiments. --, therefor.

In column 5, line 56, delete "And" and insert -- and --, therefor.

In column 6, line 44, delete "[action, role]," and insert -- ([action, role], --, therefor.

In column 12, line 28, delete "In" and insert -- in --, therefor.

In column 13, line 45, delete "performance" and insert -- performance, --, therefor.

In column 13, line 46, delete "provider.)" and insert -- provider. --, therefor.

In column 16, line 67, delete "Java(®" and insert -- Java ® --, therefor.

In column 19, line 37, delete "vitual" and insert -- virtual --, therefor.

Signed and Sealed this

Seventeenth Day of August, 2010

David J. Kappos
*Director of the United States Patent and Trademark Office*